United States Patent
Sakayori et al.

(10) Patent No.: US 7,318,198 B2
(45) Date of Patent: Jan. 8, 2008

(54) APPARATUS OPERATION DEVICE FOR OPERATING AN APPARATUS WITHOUT USING EYESIGHT

(75) Inventors: Tetsuya Sakayori, Tokyo (JP); Yoshinaga Kato, Yokohama (JP)

(73) Assignee: Ricoh Company, Ltd., Kanagawa-Ken (JP)

( * ) Notice: Subject to any disclaimer, the term of this patent is extended or adjusted under 35 U.S.C. 154(b) by 929 days.

(21) Appl. No.: 10/420,750

(22) Filed: Apr. 23, 2003

(65) Prior Publication Data

US 2003/0218642 A1    Nov. 27, 2003

(30) Foreign Application Priority Data

Apr. 30, 2002 (JP) ............................. 2002-129027
Jun. 21, 2002 (JP) ............................. 2002-180927

(51) Int. Cl.
 *G06F 3/00* (2006.01)
(52) U.S. Cl. ..................... 715/729; 715/727; 715/865
(58) Field of Classification Search ................ 715/729, 715/727, 865

See application file for complete search history.

(56) References Cited

U.S. PATENT DOCUMENTS

| 5,531,600 | A  | * | 7/1996 | Baer et al. ................. 434/317 |
| 5,715,412 | A  | * | 2/1998 | Aritsuka et al. ............ 715/729 |
| 6,243,682 | B1 | * | 6/2001 | Eghtesadi et al. .......... 704/270 |
| 6,624,803 | B1 | * | 9/2003 | Vanderheiden et al. ..... 345/156 |
| 2001/0002128 | A1 | * | 5/2001 | Takayama et al. .......... 345/352 |

FOREIGN PATENT DOCUMENTS

| JP | 10-117263 | 5/1998 |
| JP | 2000-322178 | 11/2000 |

* cited by examiner

*Primary Examiner*—Kieu D. Vu
(74) *Attorney, Agent, or Firm*—Dickstein Shaprio LLP

(57) ABSTRACT

An apparatus operation device for operating an apparatus comprising an operation input device configured to allow a user to input an instruction for operating the apparatus without using eyesight, and an output device configured to output information informing the user of a status of inputting the instruction for operating the apparatus and a result of inputting the instruction for operating the apparatus by a sound and a voice so that the user can operate the apparatus without using eyesight.

19 Claims, 17 Drawing Sheets

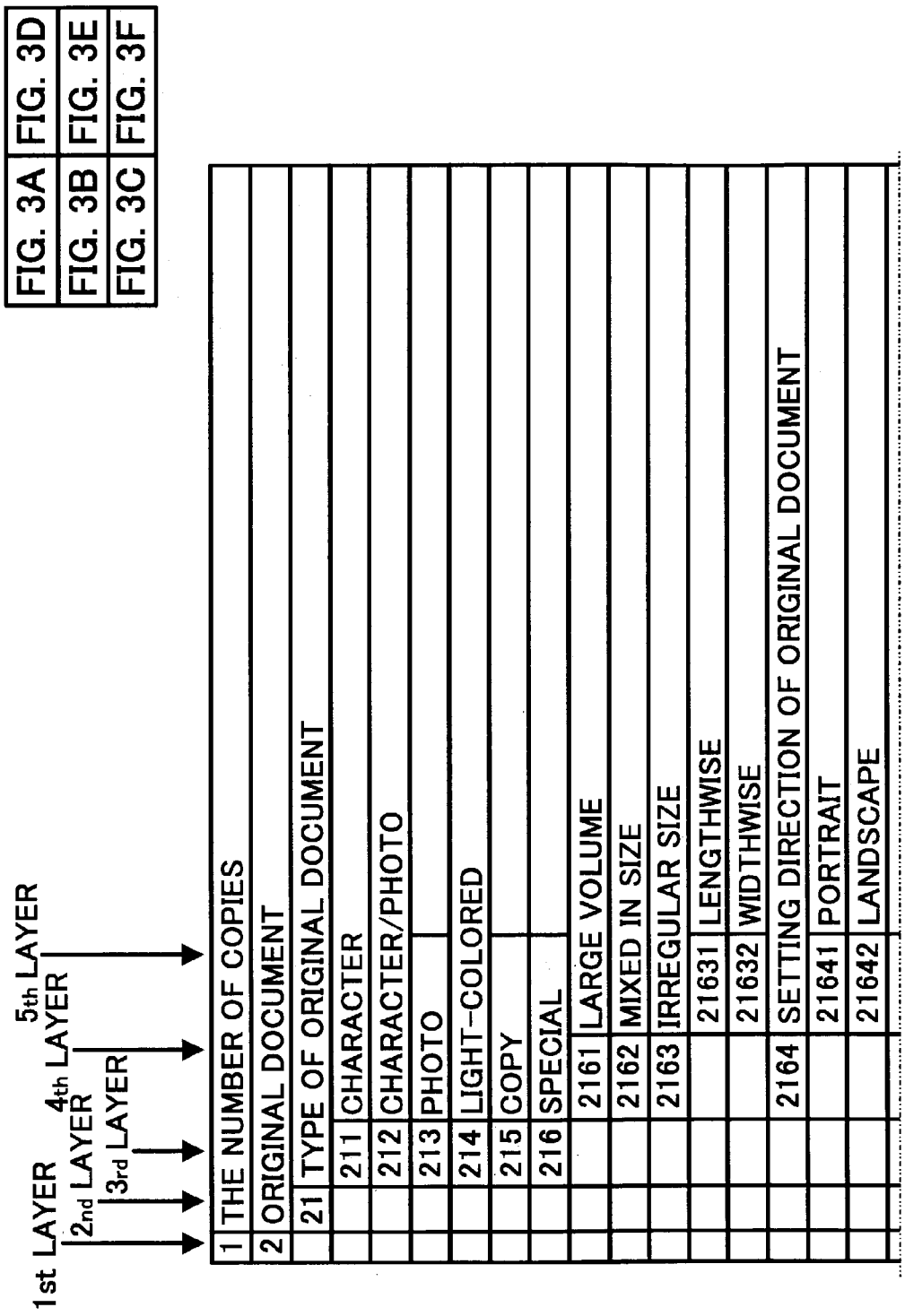

FIG. 3B

| | | | | | | | | | |
|---|---|---|---|---|---|---|---|---|---|
| 22 | DENSITY | | | | | | | | |
| | 221 | AUTOMATIC | | | | | | | |
| | 222 | DARKER | | | | | | | |
| | 223 | LIGHTER | | | | | | | |
| 3 | PAPER | | | | | | | | |
| | 31 | AUTOMATIC SELECTION | | | | | | | |
| | 32 | TRAY 1 | | | | | | | |
| | 33 | TRAY 2 | | | | | | | |
| | 34 | TRAY 3 | | | | | | | |
| | 35 | TRAY 4 | | | | | | | |
| | 36 | LARGE VOLUME PAPER FEEDING UNIT | | | | | | | |

FIG. 3C

| | | | |
|---|---|---|---|
| 37 | MANUAL FEEDING | | |
| | 371 | TYPE OF PAPER | |
| | | 3711 | PLAIN PAPER |
| | | 3712 | OHP |
| | | 3713 | THICK PAPER |
| | 372 | SIZE OF PAPER | |
| | | 3721 | AUTOMATIC SELECTION |
| | | 3722 | A3 LATERAL |
| | | 3723 | A4 LATERAL |
| | | 3724 | A4 VERTICAL |
| | | 3725 | A5 LATERAL |
| | | 3726 | B4 LATERAL |
| | | 3727 | B5 LATERAL |
| | | 3728 | IRREGULAR SIZE |
| | | | 37281 LENGTHWISE |
| | | | 37282 WIDTHWISE |
| 4 | MAGNIFICATION CHANGING | | |
| | 41 | SAME MAGNIFICATION | |
| | 42 | ENLARGEMENT | |
| | | 421 | 115% |
| | | 422 | 122% |
| | | 423 | 141% |
| | | 424 | 200% |
| | | 425 | 400% |

FIG. 3D

| | | |
|---|---|---|
| 43 | REDUCTION | |
| | 431 | A LITTLE SMALLER |
| | 432 | 93% |
| | 433 | 87% |
| | 434 | 82% |
| | 435 | 71% |
| | 436 | 61% |
| | 437 | 50% |
| | 438 | 25% |
| 44 | TEN-KEY ZOOMING | |
| 45 | DIMENSIONAL MAGNIFICATION CHANGING | |
| | 451 | LENGTH OF ORIGINAL DOCUMENT |
| | 452 | LENGTH OF COPY |
| 46 | % INDEPENDENT MAGNIFICATION CHANGING | |
| | 461 | LENGTHWISE |
| | 462 | WIDTHWISE |
| 5 | BOTH-SIDE/GATHERING/DIVIDING | |
| | 51 | ORIGINAL DOCUMENT |
| | | 511 ONE-SIDE |
| | | 512 BOTH-SIDE |
| | 52 | COPY |
| | | 521 ONE-SIDE |
| | | 522 BOTH-SIDE |

FIG. 3E

| | | |
|---|---|---|
| 53 | OPENING DIRECTION OF ORIGINAL DOCUMENT | |
| | 531 | LATERAL |
| | 532 | VERTICAL |
| 54 | OPENING DIRECTION OF COPY | |
| | 541 | LATERAL |
| | 542 | VERTICAL |
| 55 | GATHERING | |
| | 551 | EVERY 2 PAGES TO ONE-SIDE |
| | 552 | EVERY 4 PAGES TO ONE-SIDE |
| | 553 | EVERY 8 PAGES TO ONE-SIDE |
| | 554 | EVERY 4 PAGES TO BOTH-SIDE |
| | 555 | EVERY 8 PAGES TO BOTH-SIDE |
| | 556 | EVERY 16 PAGES TO BOTH-SIDE |
| 56 | DIVIDING | |
| | 561 | TWO-PAGE SPREAD TO ONE-SIDE |
| | 562 | RIGHT-AND-LEFT PAGES TO BOTH-SIDE |
| | 563 | FRONT-AND-BACK PAGES TO BOTH-SIDE |
| 57 | BINDING | |
| | 571 | ONE-SIDE TO MINI-BOOK |
| | 572 | BOTH-SIDE TO MINI-BOOK |
| | 573 | ONE-SIDE TO WEEKLY MAGAZINE |
| | 574 | BOTH-SIDE TO WEEKLY MAGAZINE |

FIG. 3F

| 6 | FINISHER | | |
|---|---|---|---|
| | 61 | SORTING/STACKING | |
| | | 611 | SORTING |
| | | 612 | STACKING |
| | 62 | STAPLING | |
| | | 621 | TOP |
| | | 622 | LEFT |
| | | 623 | UPPER-LEFT |
| | 63 | PUNCHING | |
| | | 631 | LEFT |
| | | 632 | RIGHT |
| ... | | | |

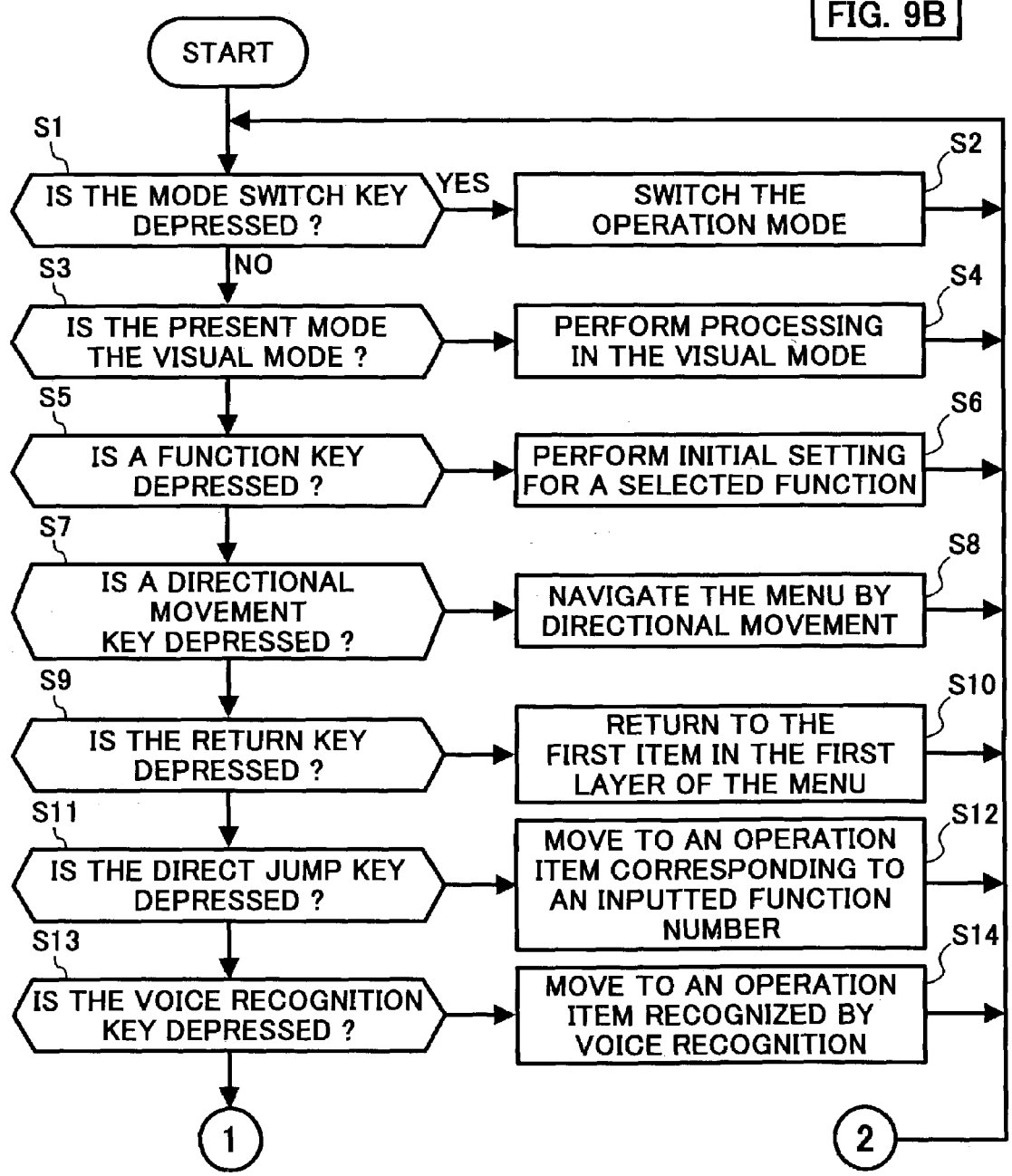

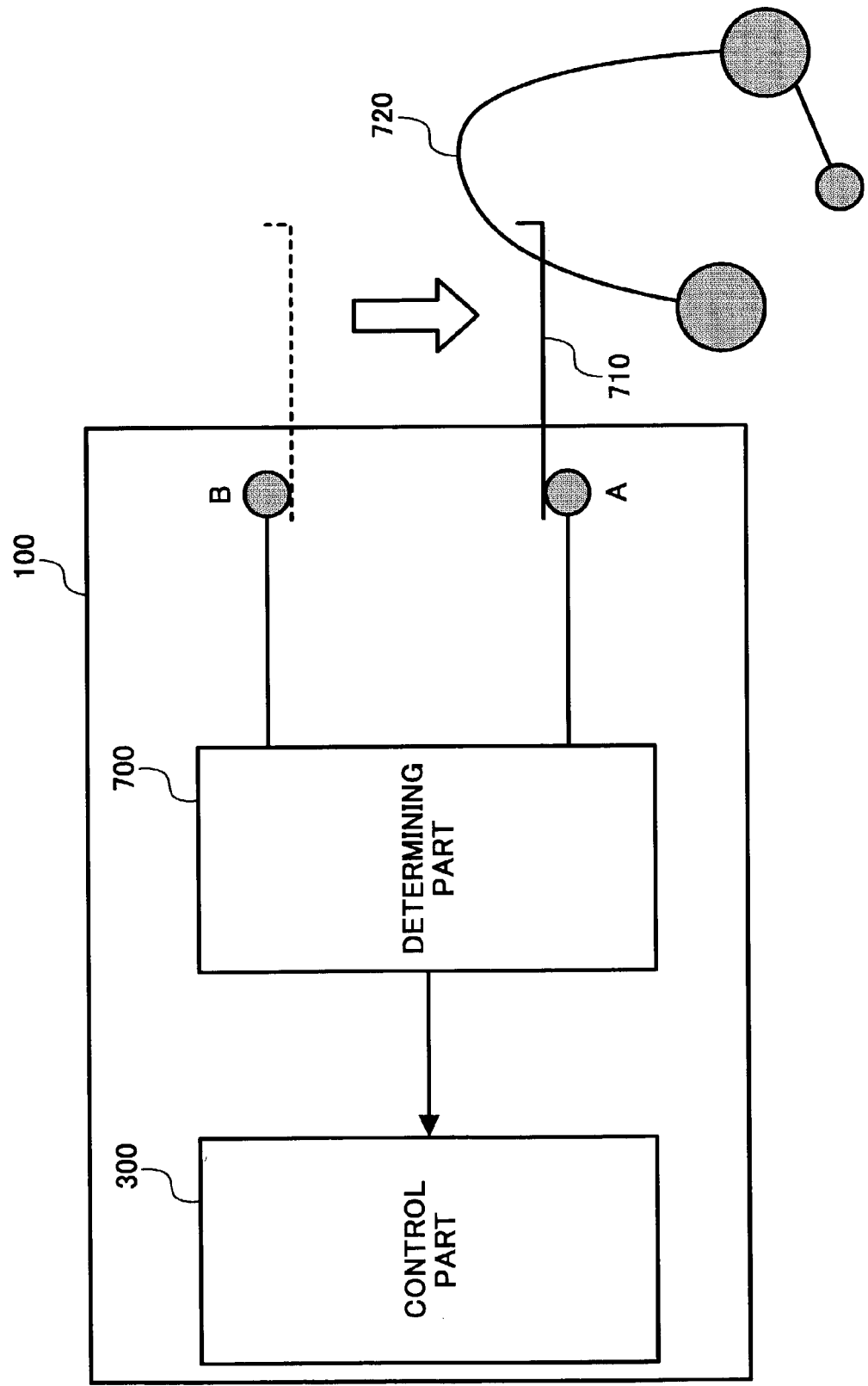

APPARATUS OPERATION DEVICE FOR OPERATING AN APPARATUS WITHOUT USING EYESIGHT

The present application claims priority and contains subject matter related to Japanese Patent Applications No. 2002-129027 and No. 2002-180927 filed in the Japanese Patent Office on Apr. 30, 2002 and Jun. 21, 2002, respectively, the entire contents of which are hereby incorporated by reference.

BACKGROUND OF THE INVENTION

1. Field of the Invention

The present invention relates to an apparatus operation device and method that allows various operations of an apparatus to be performed without using eyesight, an image forming apparatus using the device and method, and a computer program product therefore.

2. Discussion of the Background

Recently, apparatuses for office use, such as copiers, facsimile apparatuses, printers, scanners, and MFPs (multi-function peripherals) for copying, faxing, printing, and scanning, have greatly diversified in their functions as a result of adopting digital technology. Due to diversified functions, it is difficult to operate these apparatuses using ten keys and function keys only. A touch panel input system is now widely used in these apparatuses. A touch panel is provided on a display screen of a display device, while characters indicating an operation procedure and icons indicating input positions are displayed on the screen. A user provides input by touching an input area that is provided for each icon.

However, it is desirable to have an office environment that physically handicapped persons can work in with the ease that physically unimpaired persons do. In the United States (U.S.), Rehabilitation Act 508 came into force as of Jun. 21, 2001, obligating the U.S. Federal Government to obtain apparatuses physically handicapped persons can use when the government procures information technology apparatuses. There are also signs that state governments and related agencies, and private sectors are beginning to procure apparatuses physically handicapped persons can use.

Apparatuses for office use, particularly MFPs, have the tendency to be complicated in their operations due to diversified functions. Operating an MFP correctly is now becoming relatively difficult unless operating instructions are displayed on a display screen and/or a touch panel. Consequently, visually-handicapped persons suffer a distinct disadvantage in operating MFPs.

Where an MFP can be operated by keys, a visually handicapped person may memorize the arrangement of the keys and rely on their sense of touch. However, it is almost impossible for a visually handicapped person to operate a virtual button on a liquid crystal display panel, which cannot be perceived by the sense of touch. The operating procedure and the position of a touch area on the display panel must be remembered in advance, and when the operating procedure and the touch area are changed, the visually handicapped person will no longer be able to operate the virtual buttons on the display panel. Practically speaking, it is impossible for a visually handicapped person to operate an MFP.

To address the above problem, an MFP is configured such that when an ID card, having information recorded therein indicating that the holder of the ID card is a visually handicapped person, or an earphone has been inserted into the MFP indicating that the user is a visually handicapped person, audio guidance by a voice synthesizing device or Braille guidance using a Braille output device is performed.

An automatic teller machine used in banking facilities is provided with Braille keys, a Braille output device configured to output given characters in Braille, and an output function to output audio guidance from a handset. When an ID card, having information recorded therein that the holder of the ID card is a visually handicapped person, or an earphone has been inserted into the machine indicating that the user is a visually handicapped person, the audio guidance is output from the handset to lead the user through operation. The user selects a transaction item and inputs a transaction amount using the keys with Braille, and an inputting result is output by the Braille output deice, so that even a visually handicapped person can perform transaction by operating the machine by himself or herself.

However, relative to the number of visually unimpaired persons using such machines, the number of visually handicapped persons using such machines is very small, so that incorporating the above-described features for visually handicapped persons in all of the machines is not economical.

Further, if an automatic teller machine that is not provided with a Braille output device and a handset is near and/or an automatic teller machine with a Braille output device and handset; of two ATM's having different positions and methods of using Braille outputting devices and handsets are close together, visually handicapped persons may be confused.

Japanese Patent Laid-open publication No. 10-117263 describes a multi-function apparatus, wherein if an operation mode is switched to an audio guiding mode by an operator and a handset is taken off a hook, audio guidance is switched to be output from a handset instead of a speaker so that the audio guidance is not heard outside. Therefore, the operator can operate the apparatus without disturbing people nearby.

Such a method of audio guidance can help an operator understand the operation of the apparatus at first. However, the operating time for the apparatus cannot be decreased once the operator has been familiarized with the operation of the apparatus. Further, operations other than those following the operating procedures prepared in advance, such as those prepared for visually handicapped persons, are not possible using such audio guidance. Therefore, all of the functions provided for visually unimpaired persons may not be accessible to visually handicapped persons. This prevents visually handicapped persons from entering the workplace.

Japanese Patent Laid-open publication No. 2000-322178 describes an image forming system for facilitating various operations by visually handicapped persons. In the system, when a visually handicapped person holding an ID card approaches an image formation instructing device configured to output an image forming instruction to an image forming apparatus, the image formation instructing device reads an ID code from the ID card. If it is determined, by referring to an individual information file, that the person holding the ID card is visually handicapped, operating guidance for operating the image forming apparatus is output audibly using a voice synthesizing device.

In such an image forming system, those who are visually handicapped are registered in the individual information file. However, those who have difficulty in seeing displayed contents of an operation panel, e.g., amblyopic or presbyopic persons, and those who cannot see the displayed contents, e.g., those who are too short or in wheel chairs, are not targeted users of the system, and will experience difficulty using the system.

SUMMARY OF THE INVENTION

The present invention has been made in view of the above-discussed and other problems and addresses the above-discussed and other problems.

Preferred embodiments of the present invention provide a novel apparatus operation device and method that allows various operations of an apparatus to be easily and reliably performed without using eyesight; a novel image forming apparatus using the same apparatus operation device and method; and a novel computer program product for the apparatus operation device and the image forming apparatus.

According to a preferred embodiment of the present invention, an apparatus operation device for operating an apparatus includes an operation input device configured to allow a user to input an instruction for operating the apparatus without using eyesight, and an output device configured to output information informing the user of a status of inputting the instruction for operating the apparatus and a result of inputting the instruction for operating the apparatus by a sound and a voice so that the user can operate the apparatus without using eyesight.

In the above-described apparatus operation device, the output device may be configured to output information informing the user of the progress and/or a result of the apparatus' operation by a sound and a voice, when an operation is performed and/or completed by the apparatus according to the input instruction.

Further, in the above-described apparatus operation device, the apparatus may include an operation menu in which operation items for a function of the apparatus and setting items for each operation item are arranged in a layered tree-structure. The instruction for operating the apparatus may be input by moving a presently pointed position on the operation menu to a desired operation or setting item in the operation menu to select the desired operation or setting item to be set and by confirming selection of the desired operation or setting item at the presently pointed position with the operation input device.

According to another preferred embodiment of the present invention, an apparatus operation device for operating an apparatus includes an operation menu in which operation items for a function of the apparatus and setting items for each operation item are arranged in a layered tree-structure. The apparatus is configured to be operated by selecting or setting a value to a setting item in the operation menu. An operation support information file stores operation support information, for each keyword, including information of operation items and setting items including the keyword and voice information explaining about the operation items and setting items including the keyword, the information of the operation items and setting items including the keyword and the voice information being associated with each other. A help operation part retrieves operation support information corresponding to a result of recognizing a keyword uttered by a user from the operation support information file and to cause the voice information of the retrieved operation support information to be output so that the user can select a setting item relating to the keyword uttered by the user based upon the voice information. When the apparatus is switched to a non-visual operation mode for operating the apparatus without using eyesight, the apparatus is operated by determining a setting item, that has been selected by the user via the help operation part relative to the keyword uttered by the user, to be a setting item designated by the user.

According to still another preferred embodiment of the present invention, an apparatus operation method for operating an apparatus is provided. The method includes inputting an instruction for operating the apparatus without using eyesight; and outputting information informing the user of a status of inputting the instruction for operating the apparatus and a result of inputting the instruction by a sound and a voice so that the user can operate the apparatus without using eyesight.

In the apparatus operation method, in the outputting step, when an operation is performed and/or completed by the apparatus according to the instruction for operating apparatus input in the inputting step, information informing the user of a progress and/or a result of the operation of the apparatus may be output by a sound and a voice.

Further, in the apparatus operation method, the apparatus may include an operation menu in which operation items for a function of the apparatus and setting items for each operation item are arranged in a layered tree-structure, and in the inputting step, the instruction for operating the apparatus may be input by moving a presently pointed position on the menu to a desired operation or setting item in the operation menu to select the desired operation or setting item to be set and by confirming selection of the desired operation or setting item at the presently pointed position.

According to still another preferred embodiment of the present invention, an apparatus operation method for operating an apparatus, the apparatus including an operation menu in which operation items for a function of the apparatus and setting items for each operation item are arranged in a layered tree-structure and being configured to be operated by selecting or setting a value to a setting item in the operation menu, is provided. The apparatus operation method includes the steps of: storing operation support information for each keyword in an operation support information file, the operation support information including information of operation items and setting items including the keyword and voice information explaining about the operation items and setting items including the keyword, and the information of the operation items and setting items including the keyword and the voice information being associated with each other; and retrieving operation support information corresponding to a result of recognizing a keyword uttered by a user from the operation support information file and causing voice information of the retrieved operation support information to be output so that the user can select a setting item relating to the keyword uttered by the user based upon the voice information. When the apparatus is switched to a non-visual operation mode for operating the apparatus without using eyesight, the apparatus is operated by determining a setting item, that has been selected by the user in the retrieving step relative to the keyword uttered by the user, to be a setting item designated by the user.

BRIEF DESCRIPTION OF THE DRAWINGS

A more complete appreciation of the present invention and may of the attendant advantages thereof will be readily obtained as the same becomes better understood by reference to the following detailed description when considered in conjunction with accompanying drawings, wherein:

FIG. 3A through FIG. 3F are diagrams illustrating a part of an exemplary construction of a layered operation menu of the MFP with respect to a copying function;

FIG. 9A and FIG. 9B are flowcharts illustrating an exemplary process of an operation of the MFP relative to the copying function;

FIG. 11 is a diagram illustrating another exemplary configuration of the MFP.

DETAILED DESCRIPTION OF THE PREFERRED EMBODIMENTS

Figure 1:
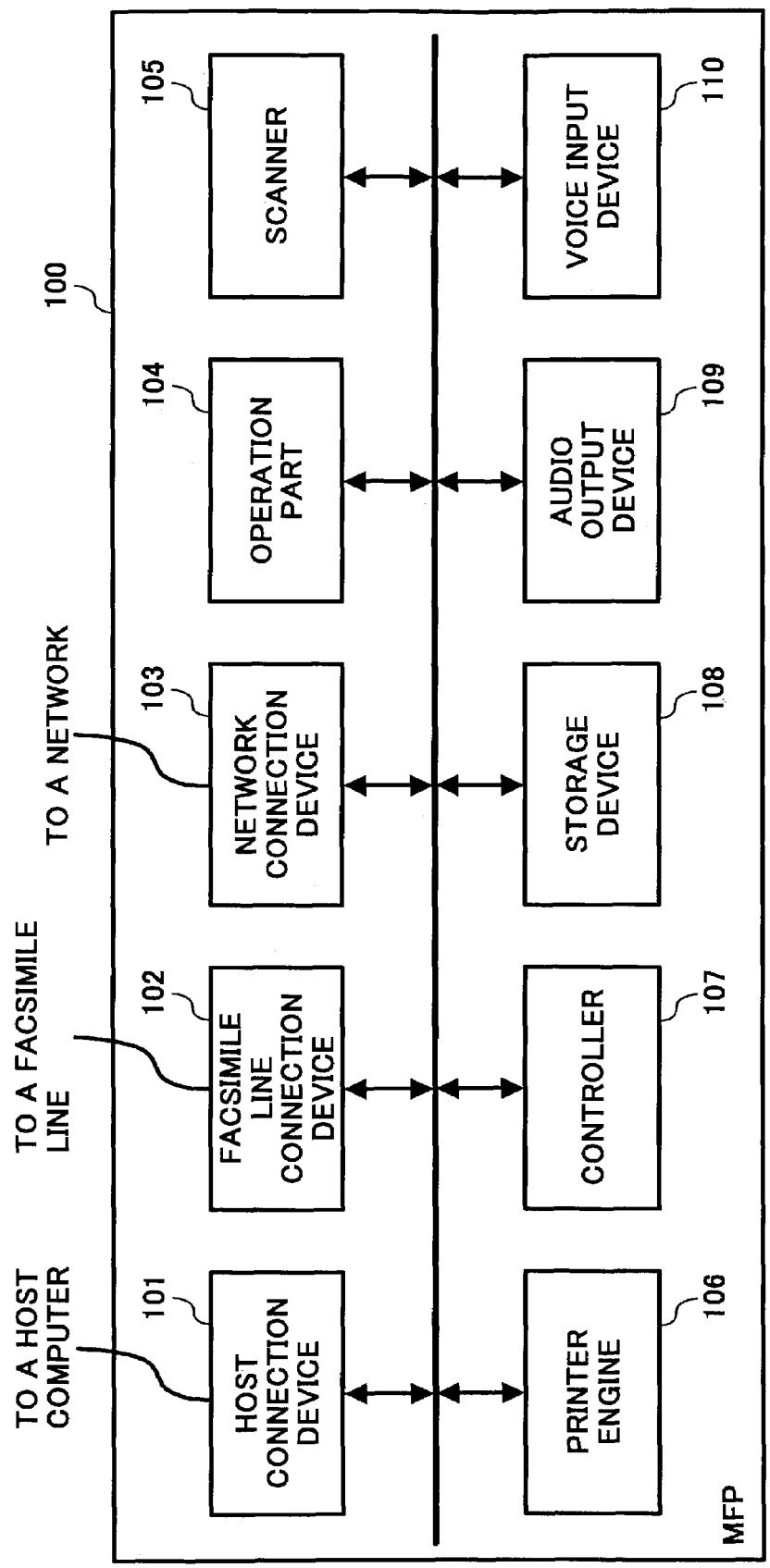
FIG. 1 is a block diagram of an MFP incorporating an apparatus operation device according to a preferred embodiment of the present invention.

Referring now to the drawings, wherein like reference numerals designate identical or corresponding parts throughout the several views, preferred embodiments of the present inventions are described.

Description of the preferred embodiments will be made for a case that an apparatus operation device of the present invention is incorporated in an MFP (multi-function peripheral). However, the apparatus operation device of the present invention can be incorporated in any apparatus having diversified functions. Specifically, the apparatus operation device of the present invention can be incorporated in various types of image forming apparatuses such as copiers, facsimile machines, printers, scanners, etc.

FIG. 1 is a block diagram of an MFP in which an apparatus operation device according to a preferred embodiment of the present invention is incorporated. An MFP 100 includes, as illustrated in figure, a host connection device 101 configured to connect the MFP 100 with a host computer; a facsimile line connection device 102 configured to connect the MFP 100 with a facsimile line; a network connection device 103 configured to connect the MFP 100 with a network such as the Internet, etc.; an operation part 104 for performing various setting operations of the MFP 100; a scanner 105 configured to scan an image of an original document placed on an original document platen to generate image data of the image; and a printer engine 106 equipped with an image forming device and a sheet feeding and discharging device. The MFP 100 further includes a controller 107 configured to perform control of the entire part of the MFP 100, processing of printing language, control of facsimile communication, control of the scanner 105, processing of user recognition, control of audio outputting, processing of image data editing, and control of operations of the MFP 100. The MFP 100 further includes a storage device 108 for storing image data received through facsimile communication, communication records, and image data used with various functions of the MFP 100; an audio output device 109, such as a speaker, a headphone, etc., configured to output a sound and a voice according to a result of an operation of the MFP 100 in response to an operating instruction by a user; and a voice input device 110 configured to input a voice uttered by the user for the operating instruction.

In the MFP 100, when using a printing function, printing data transmitted from the host computer via the host connection device 101 or from a computer connected via the network connection device 103 is temporarily stored in a receiving buffer of the controller 107, bitmapped into image data by the controller 107 according to printing language processing, and sent to the printer engine 106 to be printed.

When using a copying function of the MFP 100, according to an instruction of the controller 107, image data read by the scanner 105 is sent to the printer engine 106 to be printed.

When a user of the MFP 100 is an unimpaired person who can freely operate the MFP 100, the user gives an instruction of copying according to icon information displayed on an operation panel of the operation part 104. Image data read by the scanner 105 is once stored in the storage device 108. After executing editing of the image data, overlaying of a plurality of images, etc. by image data editing processes of the controller 107, the image data is printed by the printer engine 106 or sent to a facsimile apparatus via facsimile communication by the facsimile line connection device 102.

When a user of the MFP 100 is a physically handicapped person who cannot freely operate the MFP 100, the user judges and confirms an operating status of the MFP 100 by a sound that is output by the audio output device 109 in response to an instruction given by an input device which can be identified by the user, such as a ten-key pad, or by the voice input device 110.

The MFP 100 can transmit image data read by the scanner 105, facsimile image data obtained via the facsimile line connection device 102, and image data obtained via the network connection device 103, to a computer via the host connection device 101 or the network connection device 103. MFP 100 can also edit image data received by an application of the computer. Further, the MFP 100 can obtain image data from an image data server connected with the Internet via the network connection device 103, and print the image data by the printer engine 106.

Figure 2:
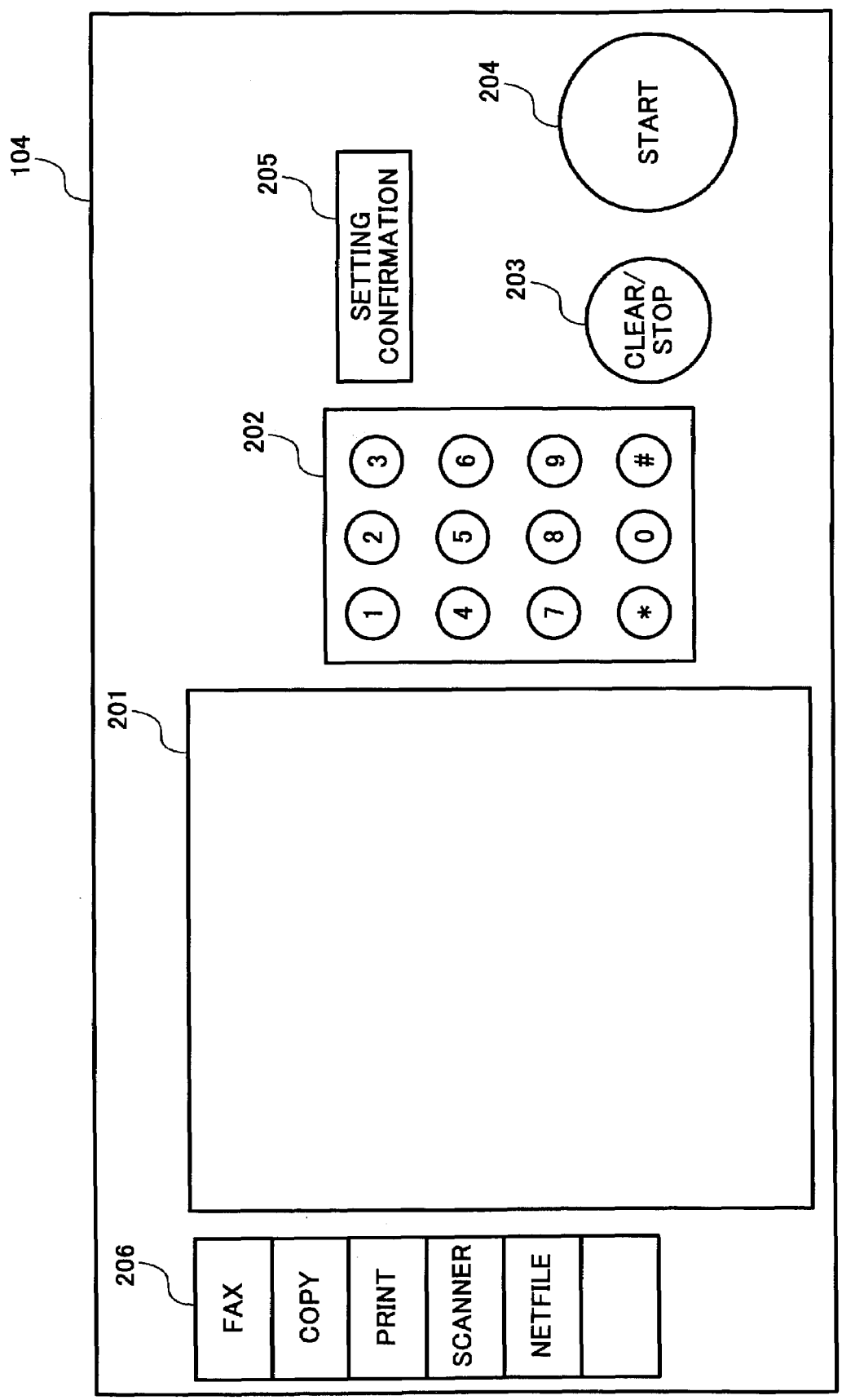
FIG. 2 is a front view of an operation part of the MFP.

FIG. 2 is a front view of the operation part 104 of the MFP 100. A liquid crystal display part (LCD) 201 including a touch panel is provided at the center of the operation part 104. The liquid crystal display part 201 displays setting items for the functions incorporated in the MFP 100, i.e., copying, facsimile, printing, and scanning functions, etc. A user operates the MFP 100 by setting values to the setting items displayed in the liquid crystal display part 201. Switching of a selected function among the copying, facsimile, printing, scanning functions, etc., is performed by operating a function key set 206 arranged at the left side of the liquid crystal display part 201. At the right side of the liquid crystal display part 201 in FIG. 2, are a ten-key pad 202, a clear/stop key 203, a start key 204, and a setting confirmation key 205, which are commonly used for each function.

Users of the MFP 100 are classified into two groups, a first group of those who cannot freely operate the MFP 100 by seeing the display screen and by operating the touch panel of the liquid crystal display part 201, and a second group of those who can freely operate the MFP 100.

People in the first group may be visually handicapped persons, physically handicapped persons, amblyopic persons, and presbyopic persons (hereinafter collectively called visually handicapped persons). Further, those physically unimpaired persons selecting to operate the MFP 100 using voice and sound instructions are included in this first group. When a user in this first group operates the MFP 100, guidance messages for guiding the user are given by voices and sounds. Such a mode of operating the MFP 100 in accordance with guidance messages by voices and sounds is hereinafter referred to as a "non-visual mode."

People in the second group, who can freely operate the MFP 100, are those who are not included in the first group.

Users in this second group operate the MFP 100 using the liquid crystal display part 201 and the touch panel provided therein. Such a mode of operating the MFP 100 using the liquid crystal display part 201 and the touch panel thereof is hereinafter referred to as a "visual mode."

Now, an outline of an operation of the MFP 100 is described taking as an example the operation of copying an original document. It is presumed that whether a user operating the MFP 100 is of the first group or of the second group, the user is familiar with locations of the power source switch and the ten-key pad 201 of the MFP 100 and has learned the basics of the functions and the operation of the MFP 100.

The MFP 100 is configured such that the visual mode is set when the power is turned on. Therefore, in the state that the power has been turned on, a physically unimpaired person can operate the MFP 100 by giving various operating instructions using the display screen and the touch panel of the liquid crystal display part 201 of the operation part 104.

On the other hand, a user desiring to operate the MFP 100 in the non-visual mode depresses a mode switch key (described later), and connects a headset equipped with a headphone and a microphone with the MFP 100. Thereby, the visual mode is switched to the non-visual mode, and the user is informed by a voice that the non-visual mode has been set.

As the mode switch key, a specific key, for example, the key of the ten-key pad 202 may be used, and by depressing the "*" key for more than a predetermined period of time (e.g., 3 seconds), the visual mode is switched to the non-visual mode.

Once the non-visual mode has been set, inputting operation instructions from the touch panel of the liquid crystal display part 201 is disabled. However, the non-visual mode can be switched to the visual mode again by, for example, depressing the "*" key of the ten-key pad 202, thereby enabling the touch panel of the liquid crystal display part 201.

Wireless communication using Bluetooth, for example, may be used for connecting the headset and the MFP 100.

Next, when the function key of the function key set 206 of the operation part 104 for the copying function (in FIG. 2, the key labeled as "COPY") is depressed, the user is informed by a voice through the headphone that the copying operation is ready.

Here, in the MFP 100, an operation menu listing all operable operation items of the MFP 100 is provided in advance. In the operation menu, for each of the functions, such as copying, facsimile, printing, and scanning functions, etc., operation items relative to the function and setting items for each of the operation items are arranged in a multiple-layered tree-structure. FIG. 3A through FIG. 3F illustrate a part of an exemplary operation menu, in which operation items and setting items relating to the copying function are arranged. FIG. 3A through FIG. 3F illustrate only an exemplary portion of the operation items and setting items of the copying function.

The user navigates through this layered operation menu, using directional movement keys (described later) provided in the operation part 104 or alternative keys (hereinafter collectively called "directional movement keys"), to move a presently pointed position on the operation menu to a desired setting item in the layered menu, to select the desired setting item to be set, or to set a value to the desired setting item. After completing desired setting by repeating the operation of selecting a desired setting item to be set or setting a value to the desired setting item, the user depresses the start key 204, and thereby the MFP 100 starts an operation of copying the original document according to the desired setting.

In the course of navigating through the layered menu, explanation of an operation or setting item at the presently pointed position and contents of setting items which have been set by that time are fed back to the user by voices, sounds, and pieces of background music (BGM). Therefore, the user can operate the MFP 100 without looking at a display screen of the liquid crystal display part 201 of the operation part 104 and without inputting operating instructions through the touch panel of the liquid crystal display part 201.

Here, properties of voices, sounds, and pieces of BGM used in feeding back the explanation of an operation or setting item at the presently pointed position, etc., are changed according to the type and setting state of the operation or setting item; the depth of the layer of the operation or setting item; and the position of the operation or setting item in the layer. Such properties may include the pitch of sound, the speed of sound, the kind of voice (e.g., male or female voice, mechanical voice, etc.), the quality of sound, the rhythm of sound, the tone of sound, the feeling of sound field, etc.

Further, the course of selecting operation items and setting items with the directional movement keys in the non-visual mode is displayed on the display screen of the liquid crystal display part 201. If the non-visual mode is switched to the visual mode while the headphone is kept connected with the MFP 100, a physically unimpaired person helping a visually handicapped person operate the MFP 100, can input an operation through the touch panel of the liquid crystal display part 201. A result of the corresponding operation is fed back to the headphone, so that the visually handicapped person operating the MFP 100 is informed of the operation performed by the physically unimpaired person. Thereafter, the visual mode can be switched to the non-visual mode again. Thus, a physically unimpaired person can easily help a visually handicapped person to operate the MFP 100.

Now, the construction of the layered operation menu is described more in detail. If menus of operation items of the MFP 100 are provided for the functions of the MFP 100, i.e., for the copying, facsimile, printing, and scanning functions, etc., respectively, it is hard for users to remember all of the menus. Therefore, as described above, a single operation menu is provided, in which, for each of the copying, facsimile, printing, and scanning functions, etc., that are available in the MFP 100, operable operation items and setting items for each of the operation items are arranged in a multiple-layered tree-structure. This operation menu is stored in a menu database (described later).

More specifically, if an operation item can be divided into a plurality of subclasses of the operation item, the plurality of subclasses of the operation item are arranged in a lower layer of the operation item in the tree-structure of the operation menu. Further, if an operation item of the plurality of subclasses of the operation item can be further divided into a plurality of finer subclasses of the operation item, the plurality of finer subclasses of the operation item are arranged in a lower layer of the plurality of subclasses of the operation item. Thus, each operation item is divided until reaching a final setting item for the operation item.

For example, referring to FIG. 3A through FIG. 3F illustrating a part of the operation menu relating to the copying function, the copying function is divided into such operation items as "the number of copies," "original document," "paper," "magnification changing," "both-side/gathering/dividing," and "finisher," and these operation items are arranged in the first layer of the operation menu. Further, for example, "magnification changing" in the first layer (FIGS. 3C-3D) is divided into such operation items as "same magnification," "enlargement," and "reduction," and these operation items are arranged in the second layer, and finally, "enlargement" is divided into such setting items as "115%," "122%," etc., and "reduction" is divided into such setting items as "a little smaller," "93%," etc., in the third layer, respectively. Herein below, operation items and setting items may be sometimes collectively called "operation items."

The types of setting items include the followings;
a) selection items in the same layer, from which only one item can be selected, e.g., "115%", "122%", etc. in the lower layer of "enlargement;"
b) toggle items that allow toggling between turning on and off a function, e.g., "sorting" in the lower layer of "finisher;"
c) numerical items in which a numerical value can be set, e.g., "the number of copies;" and
d) operation activating items that activate an operation, e.g., "generating an address list" listed for the facsimile function.

Further, each of the operation items and setting items is denoted by a reference number as illustrated in FIG. 3A through FIG. 3F, so that by designating such a reference number, the corresponding operation or setting item can be directly selected without navigating through each of the layers of the menu. Hereinafter, such a reference number denoting an operation or setting item is called a "function number."

Next, a method of operating the above-described layered menu is described.

Figure 4:
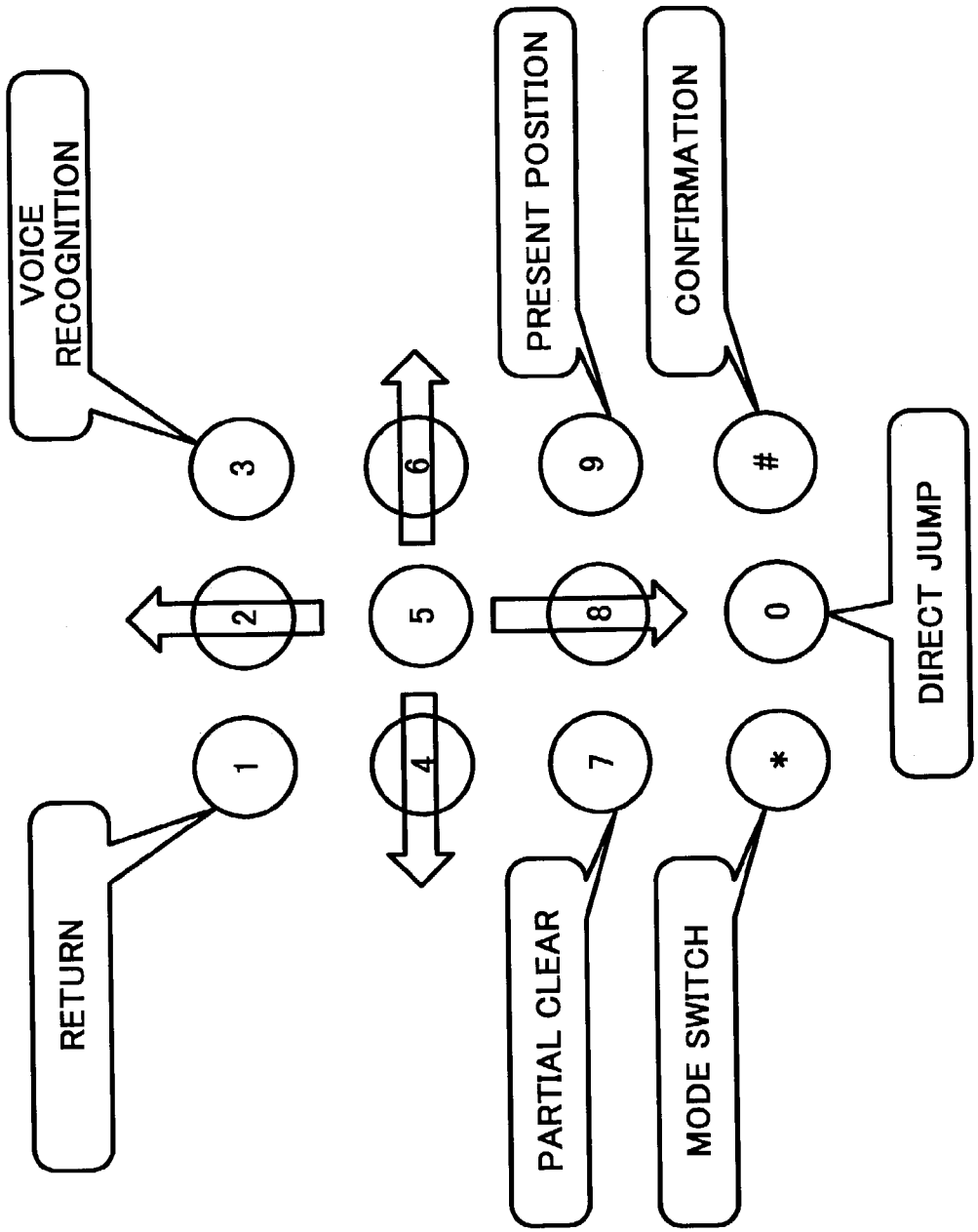
FIG. 4 is a diagram indicating functions assigned to respective keys of a ten-key pad of the MFP.

In navigating through operation items arranged in the layered menu to select a desired operation or setting item, as described above, directional movement keys or alternative keys are used. In the following description, keys of the ten-key pad 202 are used as the directional movement keys. FIG. 4 indicates functions assigned to respective keys of the ten-key pad 202. Navigating in a vertical direction in the layered menu (i.e., toward an upper or lower layer of the tree-structure of the menu) is performed using the keys "2" and "8" which are arranged in a vertical direction in the ten-key pad 202, and navigating toward a neighboring item in the same layer is performed using the keys "4" and "6" which are arranged in a horizontal direction in the ten-key pad 202.

In FIG. 4, by depressing the upward movement key "2," the presently pointed position on the layered menu is moved toward an upper layer in the layers of the menu, by depressing the downward movement key "8," the presently pointed position on the menu is moved toward a lower layer in the layers of the menu, by depressing the leftward movement key "4," the presently pointed position on the layered menu is moved toward the first operation item in the present layer, and by depressing the rightward movement key "6," the presently pointed position on the layered menu is moved toward the last operation item in the present layer. The directional movement keys for opposite directions may be assigned to respective keys. For example, the upward directional movement key may be assigned to the key "8," the downward directional movement key to the key "2," the leftward movement key to the key "6," and the rightward movement key to the key "4."

When plurality operation items exist in the lower layer, and the user has given an instruction of navigating through the menu toward a lower layer of the menu by depressing the downward movement key "8," the presently pointed position on the menu is moved by either of the following predetermined methods;

a) The presently pointed position on the menu is moved to the first operation item in the lower layer. This method is used when there isn't any predetermined operation item, which is set in advance as predetermined setting, in the lower layer. Generally, there isn't any predetermined operation item, which is set in advance as predetermined setting with respect to "type of original document. Therefore, if the downward movement key "8" is depressed when the presently pointed position is at "type of original document" in the second layer, the presently pointed position is moved to "character," which is the first operation item in the third layer.

b) The presently pointed position on the menu is moved to an operation item in the lower layer, that has been already selected and set. This method is used when an operation item in which setting has been already made exists in operation items in the lower layer, so that subsequent setting can be made or a content of setting to the operation item can be changed.

c) The presently pointed position on the menu is moved to a predetermined operation or setting item in the lower layer, which is set in advance as predetermined setting. For example, with respect to "density," among "lighter," "automatic," and "darker," "automatic" is generally selected to be set, so that "automatic" may be set in advance as predetermined setting with respect to "density." In this case, if the downward movement key "8" is depressed when the presently pointed position is at "density," the presently pointed position on the menu is moved to "automatic."

Further, in operating one of the horizontal movement keys to navigate through the menu in the same layer, when the presently pointed position on the menu is moved toward and has reached an operation item at one end of the layer, and the one of the horizontal movement keys is further depressed, the presently pointed position on the menu is moved to an operation item at the other end of the layer. That is, when navigating in a single layer of the menu, the presently pointed position is moved cyclically. Therefore, a user can easily find a desired operation item by always moving the presently pointed position on the menu in a fixed direction.

Instead of moving the presently pointed position on the menu in a layer cyclically, moving the presently pointed position on the menu may be non-cyclic and stop when the presently pointed position on the menu has reached an operation item at an end of the layer. In this case, when a desired operation item has passed, a directional movement key must be depressed to move the presently pointed position in the opposite direction.

Figure 5:
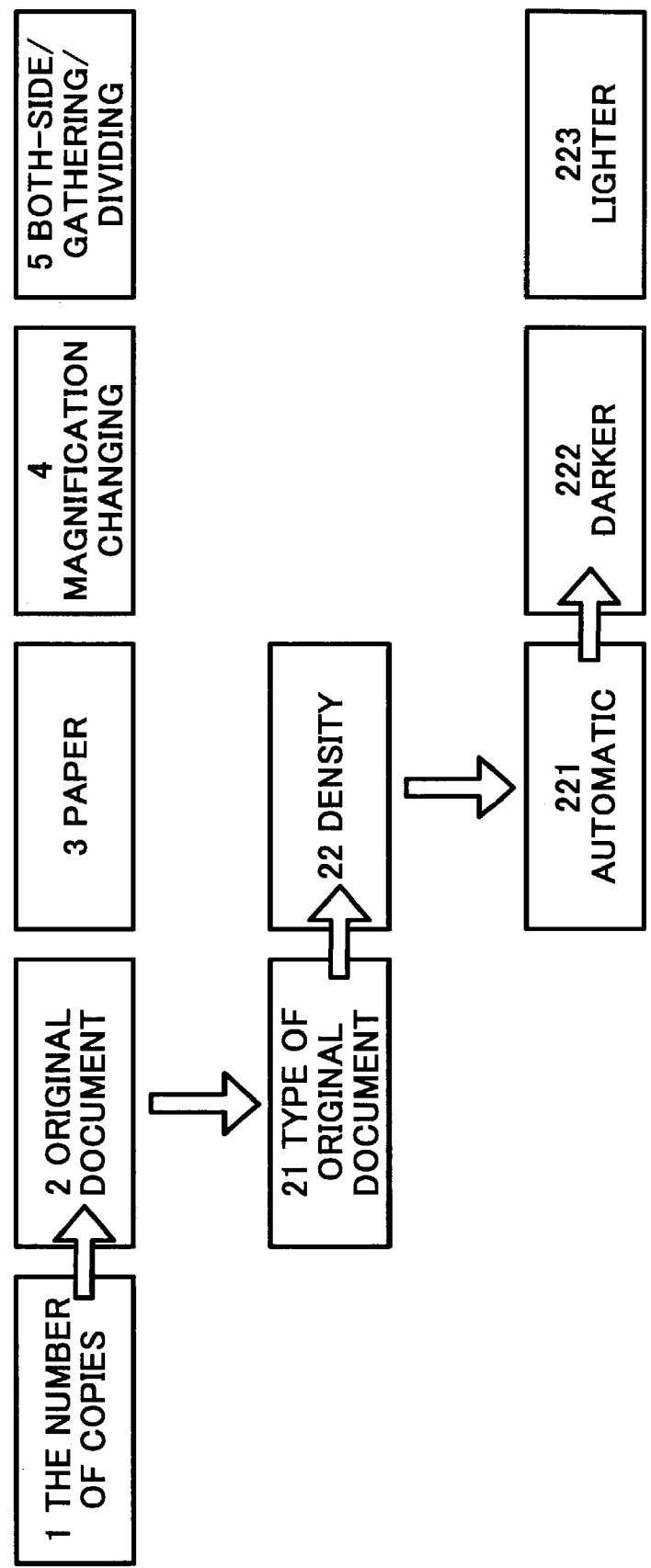
FIG. 5 is a diagram for explaining an operation of the MFP using directional movement keys.

Now, referring to FIG. 5, a method of using directional movement keys is described, taking as an example the case of operating the directional movement keys for increasing a density of a resulting copy for the reason that an image of an original document is light.

When a function key of the function key set 206 is depressed, as the initial setting, the presently pointed position on the operation menu is set to the first operation item in the first layer of a corresponding part of the operation menu (i.e., the part of the menu relating to a function corresponding to the depressed function key). In this case, because the "COPY" function key is depressed, the presently pointed position on the menu is set to "the number of copies."

Further, as described above, when the "COPY" key of the function key set 206 is depressed, the name of the operation item at the presently pointed position on the menu, in the example of FIG. 5, "the number of copies," is informed to a user by a voice.

The user then advances the presently pointed position on the menu to "original document" using the rightward movement key "6." At this time, the user is informed by a voice that the presently pointed position on the menu is now at "original document."

Then, for selecting "density," which is a subclass of "original document," the user navigates through the menu downward by one layer using the downward movement key "8." At this time, the user is informed by a voice that the presently pointed position on the menu is now at "type of original document." Further, for advancing to "density," the user depresses the rightward movement key "6." At this time, the user is informed that the presently pointed position on the menu is now at "density."

Similarly, for selecting "darker," which is a subclass of "density," the user navigates through the menu downward by one layer using the downward movement key "8." At this time, the user is informed by a voice that the presently pointed position on the menu is at "automatic."

Further, for advancing to "darker," the user depresses the rightward movement key "6." At this time, the user is informed that the presently pointed position on the menu is now at "darker." The user then depresses a confirmation key, which is, in the example of FIG. 4, the "#" key. Thereby, the setting for increasing the density of a resulting copy has been accomplished.

Further, when a user is uncertain about which operation item is currently at the presently pointed position, or when the user desires to redo selection of operation items from the first, the user can return the presently pointed position on the menu to the first operation item in the first layer of the menu (in the example of FIG. 3A through FIG. 3F, "the number of copies") from any position on the menu by depressing a return key "1" in FIG. 4.

In this case, the operation items that have been selected or set by that time are stored in the MFP 100, and by depressing the directional movement keys and the confirmation key, the user can move the presently pointed position on the menu to the operation items that have been selected or set by that time.

Further, by depressing a direct jump key "0" in FIG. 4, the user can move the presently pointed position on the menu directly to an operation item or setting item the user desires to select to set. For example, by depressing the direct jump key "0" and by further inputting a function number through the ten-key pad 202, the user can move the presently pointed position on the menu directly to an operation or setting item corresponding to the function number. For example, following depression of the direct jump key "0," if the function number "435" is input through the ten-key pad 202, the MFP 100 determines that operation items have been selected in the order of "magnification changing," "reduction," and "71%" (see FIG. 3A through FIG. 3F).

In this case, not only function numbers of setting items in the lowest layer but also those of operation items in intermediary layers can be input. When a function number of an operation item in an intermediary layer is input, the presently pointed position on the menu is moved to a predetermined setting item for the operation item, so that the user can select a desired setting item among from setting items for the operation item.

Further, instead of directly inputting the function number of a desired operation or setting item using the above-described direct jump key "0," the user can navigate through the menu to the desired operation or setting item by depressing the voice recognition key "3" and vocalizing the function number or the name of the desired operation or setting item.

When a user does not remember the function number or the name of an operation item or setting item, the user vocalizes a word representing a function. The MFP 100 recognizes the vocalized word by voice recognition, and retrieves operation items and setting items that include a recognized word from the layered menu. If only one operation or setting item has been retrieved, the presently pointed position on the menu is moved directly to the retrieved operation or setting item, and if a plurality of operation and/or setting items have been retrieved, names of the retrieved plurality of operation and/or setting items are read by a voice, and the user selects a desired operation or setting item among from the plurality of operation and/or setting items.

For example, in the layered menu of FIG. 3A through FIG. 3F, where there are "both-side/gathering/dividing" in the first layer, "binding" in the second layer, and "one-side to weekly magazine" in the third layer, when a user utters the word for "weekly magazine," regardless of the presently pointed position on the menu at that time, the presently pointed position on the menu is directly moved to "one-side to weekly magazine."

When a user utters a word, if the result of recognizing the word by voice recognition does not correspond to one of operation items and setting items listed in the menu, an operation support information file (described below) is retrieved using a word obtained as the result of recognizing the uttered word as the keyword. Voice information corresponding to a result of retrieving the operation support information file is output as guidance to the user, and the user selects a desired operation or setting item in accordance with the guidance.

Operation support information is a generated group of operation items and setting items from the operation menu also arranged in a tree-structure. Operation support information is generated by searching operation items and setting items in the operation menu, which include the keyword; retrieving the operation items and setting items with the keyword; and retrieving operation items in intermediary layers in a navigating path from an uppermost layer in the operation menu in which an operation item or setting item including the keyword exists to a lowermost layer in the operation menu in which a setting item including the keyword exists, and assembling the retrieved operation items and setting items into the tree-structure. The tree-structure of the generated group of operation items and setting items forms a part of the menu including the keyword.

Figure 6:
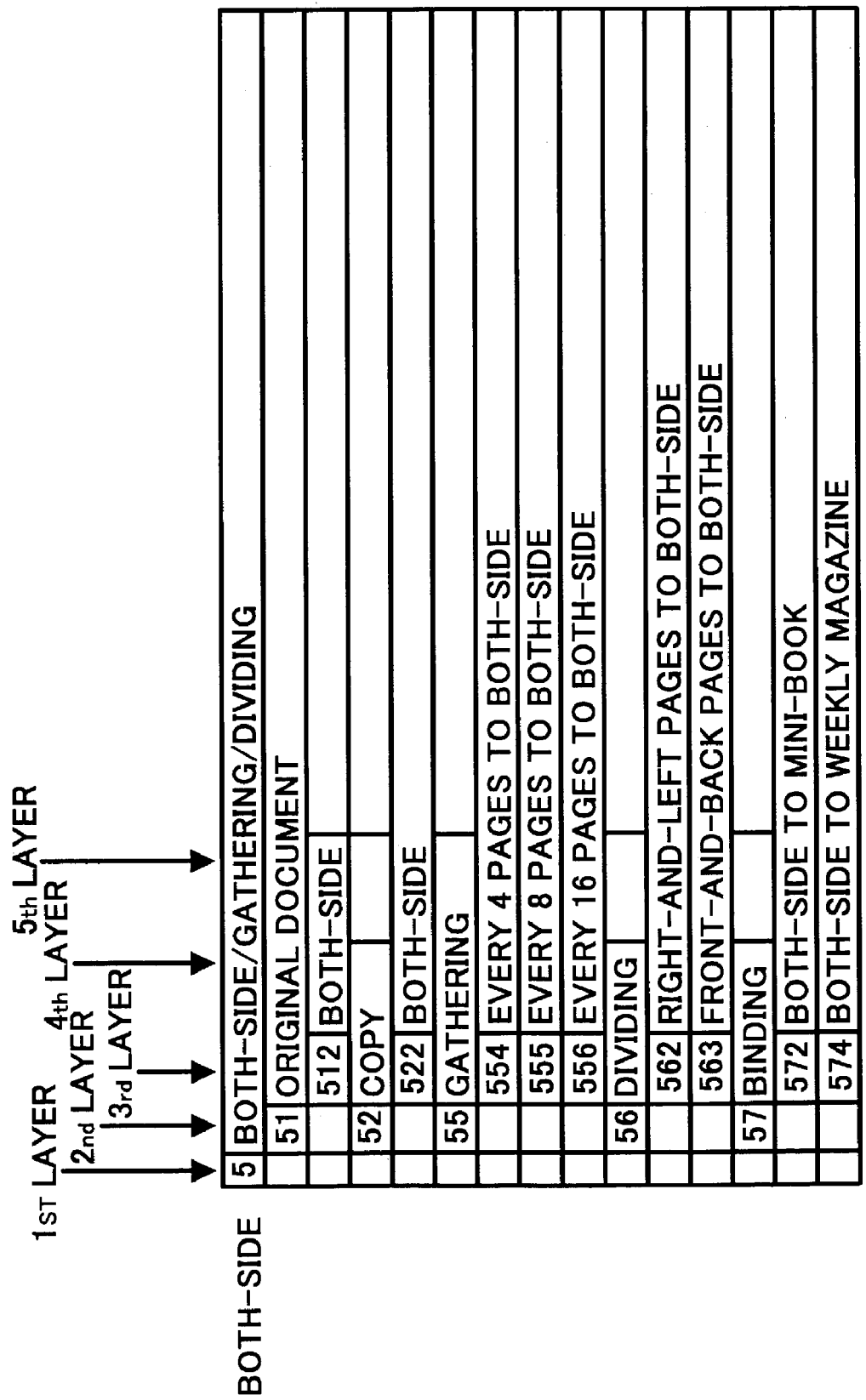
FIG. 6 is a diagram for explaining an exemplary configuration of operation support information.

For example, referring to FIG. 3A through FIG. 3F, when the keyword is "both-side," setting items including the keyword exist in lower layers of "original document," "copy," "gathering," "dividing," and "binding" that are in the lower layer of "both-side/gathering/dividing." In this case, relative to the keyword "both-side," operation support information having a tree-structure as illustrated in FIG. 6 is generated.

Figure 7:
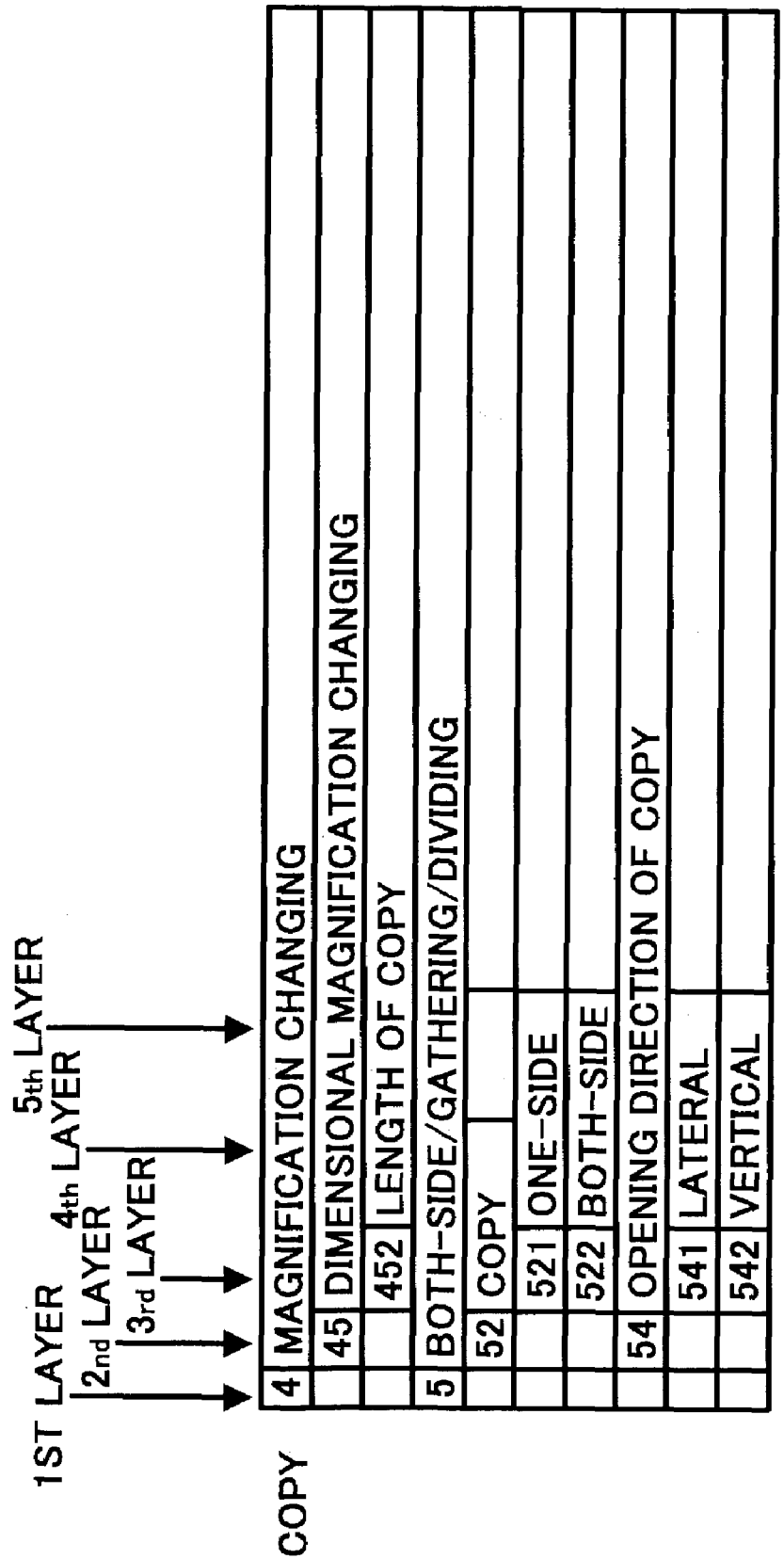
FIG. 7 is a diagram for explaining another exemplary configuration of operation support information.

Similarly, when the keyword is "copy," "length of copy," "copy," and "opening direction of copy" exist in lower layers of "magnification changing" and "both-side/gathering/dividing." In this case, because "copy" and "opening direction of copy" are not setting items in the lowest layer, setting items in the lowest layer of "copy" and "opening direction of copy" are included in a tree-structure of operation support information that is generated relative to the keyword "copy," as illustrated in FIG. 7.

With respect to each operation support information generated as described above, information of the group of operation items and setting items in the tree-structure, and voice information, generated using either of the following formats, of each node of the tree-structure (i.e., the name of an operation or setting item at the node), are registered as being associated with each other, in the operation support information file;

a) recorded voice data;
b) compressed voice data coded by CELP (code excited linear prediction), etc.; and
c) text data.

Operation support information is provided to a user by reproducing recorded voice data and compressed data after decompression, and by reading text data using voice synthesizing.

When a user uses the above-described operation support information to operate the MFP 100, the user selects a desired operation item in the following procedure.

When a user utters a word, a keyword is obtained by voice recognition of the word, the operation support information file is retrieved by the keyword, and operation support information corresponding to the keyword is extracted. Then, voice information of the extracted operation support information, i.e., the names of operation items and setting items at respective nodes of the tree-structure of the group of operation and setting items, is fully read. Thereby, the user can confirm what operation items and/or setting items exist in the extracted group of operation items and setting items. Thereafter, the voice information is read for each operation or setting item one by one, and the user confirms selection of the operation or setting item or gives an instruction to proceed to the next operation or setting item. When the user confirms selection of an operation or setting item, it is determined that the user has selected the operation or setting item.

For example, when the keyword "both-side," is uttered, the operation support information as illustrated in FIG. 6 is generated, and the user is informed by a voice that there are the following operation and/or setting items:

"setting for both-side/gathering/dividing is as follows:"
"1. set original document to both-side;"
"2. set copy to both-side;"
"3. set gathering to every 4 pages to both-side;"
"4. set gathering to every 8 pages to both-side;" and
"5. set dividing to right-and-left pages to both-side."

In the above-described example, an operation or setting item is selected while operation support information is read for each operation or setting item one by one. However, by denoting each of the operation items and setting items by a number in advance as described above, after the operation support information has been fully read, the number for a desired operation or setting item may be input through the ten-key pad 202 or by uttering the number.

In the above-described example, information of a group of operation items and setting items for a keyword in the operation support information file is configured to have a tree-structure, and when reading information of the group of operation items and setting items in the tree-structure, operation items and setting items on the navigation path in the tree-structure are sequentially read from the one in an upper level layer to the one in a lower level layer in one sentence. However, the information of a group of operation items and setting items for a keyword may be stored as voice information of one sentence, and in reading the information of a group of operation items and setting items in a tree-structure, instead of sequentially tracing operation items and/or setting items on the navigation path in the tree-structure, the voice information may be read as one sentence.

Further, in the above-described example, an operation support information file is provided. However, such an operation support information file may be omitted, and instead, it may be configured such that names of operation items and setting items in a menu database or keywords given to the operation items and setting items are retrieved, and then, names of retrieved operation items and/or setting items, and names of operation items in intermediary layers on the navigation path from a retrieved operation or setting item in the uppermost layer to a retrieved setting item in the lowermost layer, are read.

Now, returning to FIG. 4, by depressing a partial clear key "7," in setting items in a lower layer of the presently pointed position, setting values for setting items can be returned to the predetermined setting values if the setting values were previously changed. In this case, it may be configured either such that for each of the setting items in which predetermined setting values have been changed the user is asked whether to return a setting value to the setting item to a predetermined setting value; or such that the user is asked whether to return setting values to predetermined setting values for all of the setting items in which the predetermined setting values have been changed.

For example, when the presently pointed position is at "finisher," if predetermined setting values have been changed with respect to setting items for "sorting/stacking," "stapling" and "punching," which are in the lower layer of "finisher," the user can clear setting values that have been set thereto back to the predetermined setting values, respectively, by depressing the partial clear key "7."

Further, by depressing a present position key "9," information as to the presently pointed position on the menu, i.e., at which operation item in the menu the presently pointed position currently is, is fed back by a voice. The information may include, for example, a name of the operation or setting item, a function number of the operation or setting item, a set value (e.g., the number of copies), etc.

For example, after setting "size of paper" of "manual feeding" of "paper" to "A4 lateral," if the present position key "9" is depressed, information that the size of paper has been set to "A4 lateral" is fed back by a voice.

Further, by depressing a setting confirmation key 205 (FIG. 2), a user can confirm together setting items in which predetermined setting values have been changed, and further, the user can change as necessary setting values that have been set to these setting items.

After completing setting of a desired setting item (i.e., selecting the desired setting item or inputting a numerical value to the desired setting item) by navigating the operation menu using the above-described keys, the user depresses a confirmation key "#" to confirm selection and setting of the setting item. Thereby, the MFP 100 displays contents of the confirmed setting item on the display screen of the liquid crystal display part 201 of the operation part 104.

Furthermore, by depressing the mode switch key "*," the present mode is switched. If the present mode is the non-visual mode, by depressing the mode switch key "*," the non-visual mode is switched to the visual mode. At this time, if the headset is connected with the MFP 100, voices and sounds are output to the headphone of the headset. Accordingly, for completely changing the non-visual mode to the visual mode, the headset must be disconnected from the MFP 100.

If the present mode is the visual mode, by depressing the mode switch key "*" and by connecting the headset with the MFP 100, the visual mode is switched to the non-visual mode.

Further, the MFP 100 may be configured to recognize a non-contact type IC card connected with the MFP 100. In this case, contents of settings for a particular operation of the MFP 100, that have been set to the MFP 100 through the above-described operation, may be stored in the IC card with an operation name attached, and when performing the particular operation of the MFP 100 next time, by designating the operation name stored in the IC card to be read, the same contents of settings may be set to the MFP 100. Thus, the user may avoid repeating an operation of setting the same contents of settings to the MFP 100.

The MFP 100 is further configured such that, when a user performs an operation of navigating through operation items and setting items arranged in the layered menu to select a desired operation or setting item in the menu using the ten-key pad 202, a result of the operation is informed to the user by outputting to the headphone of the headset confirmation of the result by an operation sound, a sound icon, and a piece of BGM.

Here, the sound icon is static information indicating the character or type of a corresponding operation item, and is a short sound having no motion, that is different in tone from each other so that the character or type of each operation item can be identified.

The operation sounds are configured to use sounds in the same tone (e.g., a chord or short melody) that are different from each other so that an image of an operation result emerges through a sound which corresponds to an operation. For example, for operations of navigating toward upper and lower layers of the layered menu, rising and falling sounds are used. When an operation is failed or stopped, a discord and sound is used, causing a user to have feeling of insecurity. When an operation of selecting an operation item and confirming selection of the operation item is performed, a dominant sound is used causing the user to have a stable feeling.

For example, operation sounds for indicating that the presently pointed position on the menu has been moved toward upper and lower layers of the menu are prepared in advance, and when a user navigates the menu toward upper and lower layers of the menu, the operation sounds indicating that the presently pointed position on the menu has been moved toward upper and lower layers of the menu are output, so that the user is informed that the user has navigated the menu toward upper and lower layers of the menu. The operation sounds are different from the sound icons.

A sound is also used to indicate whether any operation item exists in a lower layer toward which the user is navigating the menu. Depending upon whether or not any operation item exists in the lower layer, the operation sound used to indicate that the presently pointed position on the menu has been moved toward lower layers of the menu changes. One sound is used when operation items exist in a lower layer, and a different sound is used when there are no operation items in a lower layer. Therefore, the user is informed of whether any operation item exists in the lower layer toward which the user is navigating the menu.

Further, when the MFP 100 is set for non-cyclic movement of the presently pointed position in a layer, the above-described sound is used to indicate whether the presently pointed position is at an end of the layer and that the movement directed by the user has been stopped.

Furthermore, when any of the return key "1," the horizontal movement keys "4" and "6," the direct jump key "0," and the voice recognition key "3" are depressed, operation sounds confirming that respective operations have been performed are output, and the user can be certain that the respective operations have been accepted.

Further, the piece of BGM may be slower in tempo for operation items in upper layers and faster for those in lower layers. Thereby, a user can recognize about at which layer of the menu the presently pointed position currently is.

Further, when a user inputs a numerical value, e.g., for the number of copies, the BGM may be continuously output until input of the numerical value is completed. Thereby, the user can confirm the duration that the numerical value is being input.

Furthermore, a state of the MFP 100 in operation is informed to a user by such voice messages as "the paper has run out," "the toner is getting low," "paper jamming has occurred," "the front cover is opened," etc. A voice message may not be sufficient when the MFP 100 cannot be promptly recovered. Continually outputting a piece of BGM corresponding to the state of MFP 100 even after such a voice message has ended, will inform a user of the state of the MFP 100.

For example, when a copying operation is being performed at the MFP 100 and a paper jam occurs while the user has left the MFP 100, the user will not receive the voice message and will not understand the state of the MFP 100. However, by playing a piece of BGM after the voice message, the user can understand the state of the MFP 100 based upon the piece of BGM.

Further, a piece of BGM may be continually output until the instructed number of copies is completed. For example, when a user has instructed production of 40 copies, the piece of BGM may be continually output until 40 copies are completed. Thereby, the user can know about how many copies have been completed based upon the progress of the piece of BGM.

Thus, by outputting an operation sound, a piece of BGM, or a sound icon that causes a user to have an image of the operation being performed, the user can recognize the operation of the MFP 100, and thereby uncertainty or uneasiness about whether or not input has been made or an operation has been completed is decreased.

The MFP 100 is further configured such that, when a user performs an operation of navigating the layered menu to select an operation item of the menu using the ten-key pad 202, a result of the operation is informed to the user by outputting confirmation of the result also by a voice to the headphone of the user. Thereby, a user can be certain whether or not input of an operating instruction was successful or whether an operation according to the input instruction has been performed.

Properties of the voice may be changed according to circumstances (e.g., the pitch of sound, the kind of voice, the quality of sound, the rhythm of sound, the tone of sound, the uttering speed, the sound field, etc.), so that a user can intuitively recognize circumstances the user is in.

Further, when a user reaches a desired operation or setting item after navigating the menu, a predetermined content of the desired operation or setting item is fed back by a voice.

For example, when a user reaches an operation or setting item, such as "enlargement" or "141%," a name of the operation or setting item is read. Thereby, the user can recognize the operation or setting item the user has reached.

When reading names of operation items and/or setting items, for those operation items and/or setting items that have been already selected, names of those operation items and/or setting items are read by a louder voice than for those operation items and/or setting items that have not been selected yet. Thereby, a better image is given to a user with respect to those operation items and/setting items that have been already selected and information that those operation items and/or setting items are the ones already selected is conveyed to the user more quickly and intuitively than by linguistic expression.

For example, in the layered menu of FIG. 3A through FIG. 3F, "same magnification," "enlargement," "reduction," etc. in the lower layer of "magnification changing" are operation items from which one of them is to be selected. If a user is informed about which one of the operation items is already selected, the user can avoid uselessly selecting an operation item that has been already selected.

Further, with respect to an operation item that is to be set either to an "on" or "off" state by selection, e.g., "mixed in size," unless a user can know whether the operation item is presently selected to be "on" or "off," i.e., in the case of "mixed in size," whether "mixed in size" is set to be turned on or not, the user cannot set the operation item to a desired state.

Further, in reading names of operation items and/or setting items, disabled operation items and/or setting items are read by a lower voice than for operative operation items and/or setting items. Thereby, an image having a lower level of activation is given to a user with respect to those disabled operation items and/or setting items, so that information that those operation items/or setting items are presently disabled can be conveyed to the user more quickly and intuitively than by linguistic expression.

An operation item may be disabled, such that the operation item cannot be selected, as a result of selecting another operation item. When a selected operation item necessarily precludes the selection of certain other operation items, those other operation items are disabled. For example, when "automatic selection" or "tray 1" is selected for "paper," it is not effective to select "type of paper" for "manual feeding." In this case, if the user is allowed to navigate to "manual feeding" and to "type of paper," the user misunderstands that the user can select "manual feeding" and "type of paper," and the user may be confused. If a particular operation or setting item is temporarily deleted from the layered menu or disabled, for a user who recognizes the structure of the layered menu only by -hearing, it is hard to understand why the structure of the layered menu has been changed.

The voice used in the above-described reading of operation items and/or setting items has the pitch of an ordinarily uttered voice, and difference between high and low pitches of the voice are large enough such that these high and lower pitches are differentiated from each other. Further, the pitches of the voice are in a range in which uttered contents can be clearly heard. For example, considering the ranges of voices in natural uttering and the ranges of voices in voice synthesizing in which clarity is maintained, the difference between the high and low pitches of the voice may be about a half-octave.

Further, when reading a name of an operation item, if the operation item has lower layer of operation or setting items, the name of the operation item is output with a reverberant sound added, so that an image having reverberation is given to a user. Thereby, the user is informed that subsequent operation items and/or setting items exist after this operation item more quickly and intuitively than by linguistic expression.

For example, there are two types of operation items, one type that does not have sub-classes arranged in a lower level layer, e.g., "same magnification," and another type that has sub-classes arranged in a lower level layer, e.g., "enlargement." Understanding the type of an operation item without having to further navigate the menu toward a lower layer improves ease in navigating the menu.

When the partial clear key "7" is depressed, operation items and/or setting items in lower level layers of the presently pointed position on the menu, in which predetermined setting values have been changed, are read, and the user is asked whether or not settings values set to the operation items and/or setting items are to be returned to the predetermined setting values.

A user may be asked whether or not a setting value is to be returned to a predetermined setting value for each of the operation items and/or setting items, for which the predetermined setting values have been changed, one by one. Instead, however, a user may be asked whether or not setting values in all of the operation items and/or setting items in lower layers of the presently pointed position on the menu for which predetermined setting values have been changed, are to be returned to respective predetermined setting values at one time, so that all of the setting values to the operation items and/or setting items are returned to the respective predetermined setting values at one time.

By depressing the present position key "9," information about at which operation or setting item in the layered menu the presently pointed position currently is on the menu is fed back. Predetermined information as to an operation or setting item at the presently pointed position, e.g., the name of the operation or setting item and a setting value to the operation or setting item, is fed back by a voice.

For example, after confirming setting "paper" to "A4 lateral," when the present position key "9" is depressed, a voice message saying that "the paper has been set to A4 lateral" is fed back.

After selection of a setting item has been completed, when an operation of confirming selection of the setting item is performed with the confirmation key "#," predetermined information of a content of the confirmed setting item is fed back by a voice. For example, when "200%" has been selected and confirmed for "enlargement," a voice message saying that "200% enlargement has been set for magnification changing" is fed back.

Further, when the setting confirmation key 205 is depressed, contents of setting items, which are in lower layers of an operation item (including those operation items in intermediary layers) at the presently pointed position on the layered menu and for which predetermined setting values have been changed by a user, are read together by a voice. Alternatively, the contents of the setting items may be fed back by a voice one by one. If an error is found in a setting item, the user corrects the error, navigates to a next setting item in which a predetermined setting has been changed with a directional movement key, and finally depresses the confirmation key "#" to confirm the settings.

When a user desires to confirm all of the setting items in which predetermined setting values have been changed, the user returns to the first operation item in the first layer of the menu by depressing the return key "1," then, by depressing the confirmation key "#," the user can confirm all of the setting items in which predetermined setting values have been changed at once.

After each setting item is set, a user depresses the start key 204 and the MFP 100 starts a corresponding operation. After completing the operation, the MFP 100 feeds back information of a predetermined content indicating whether or not the operation has been successful by a voice.

For example, such voice messages as "copying has been completed with the magnification of 122%" and "copying has not been completed due to a paper jam" are fed back.

Further, while a user operates the MFP 100 or the MFP 100 is in operation, following an operation sound, states of the MFP 100 are informed by a voice that is different from the voice used in the above-described operations of the operation menu. For example, a user is informed of the states of the MFP 100 by such voice messages as "the paper has run out," "the toner is running low," "paper jam has occurred," "the front cover is opened," etc.

A button may be provided in the MFP 100 for changing the properties (e.g., the pitch of sound, the kind of voice, the quality of sound, the rhythm of sound, the tone of sound, the uttering speed, the sound field, etc.) of a voice used in the above-described voice messages, so that the voice that is easy for a user to hear can be output.

Further, when a user has performed a next operation of a key before a voice message has been completed, the uttering speed of a voice of the voice message is automatically changed to be faster, so that the user does not become impatient.

It has been found out through testing that when a user operates the MFP 100 first time, the user is almost familiarized with operations of the MFP 100 by practicing the operations for about 5 minutes under guidance by sound icons, operating sounds, pieces of BGM, and voice messages.

Results of the above-described operations by a user are displayed on the display screen of the liquid crystal display part 201 in synchronism with output of the results by voices, sounds, etc. Therefore, a visually unimpaired person who can operate the MFP 100 in the visual mode can help a physically handicapped person who cannot operate the MFP 100 in the visual mode (e.g., visually handicapped, amblyopic or presbyopic person) by changing the non-visual mode to the visual mode and inputting instructions through the touch panel of the liquid crystal display part 201. Further, amblyopic and presbyopic persons may operate the MFP 100 with the visual mode by watching the display screen of the liquid crystal display part 201.

For example, when a visually handicapped user cannot operate the MFP 100 as desired, a physically unimpaired person changes the non-visual mode to the visual mode to select a setting item through the touch panel of the liquid crystal display part 201. Thereby, information of the selected setting item is output to the headphone by a sound icon, an operating sound and a voice, so that the visually handicapped person understands the selected setting item, and can continue operating the MFP 100 by returning to the non-visual mode.

Now, an exemplary operation of the MFP 100 for setting "the number of copies" to "two" is described.

First, when a user navigates the layered menu to reach "the number of copies," after an operation sound and a sound icon for "the number of copies" have been output through the headphones, the name of the setting item, i.e., "the number of copies," is read by a voice. At this time, because no lower layer exists below "the number of copies," a reverberant sound is not added to the voice.

If the user depresses the confirmation key "#" at this time, through the headphones, after an operation sound and a sound icon for "please input the number of copies with the ten-key pad and depress the confirmation key" have been output through the headphones, a guidance message for inputting the number of copies saying: "please input the number of copies with the ten-key pad and depress the confirmation key" is output by a voice, and a piece of BGM is output while a numeral value for the number of copies is input.

After inputting a numeral value for the number of copies, if the user depresses the upward movement key "2," the input numeral value is read through the headphone, and when the user depresses the confirmation key "#," after an operation sound and a sound icon for "the number of copies has been set to two" are output through the headphone, a voice message saying that "the number of copies has been set to two" is output.

Thereafter, when the user depresses the start key 204, while the copies are produced, a piece of BGM is output through the headphone. When the copies have been produced, a voice message saying that "two copies have been completed" is output.

Figure 8:
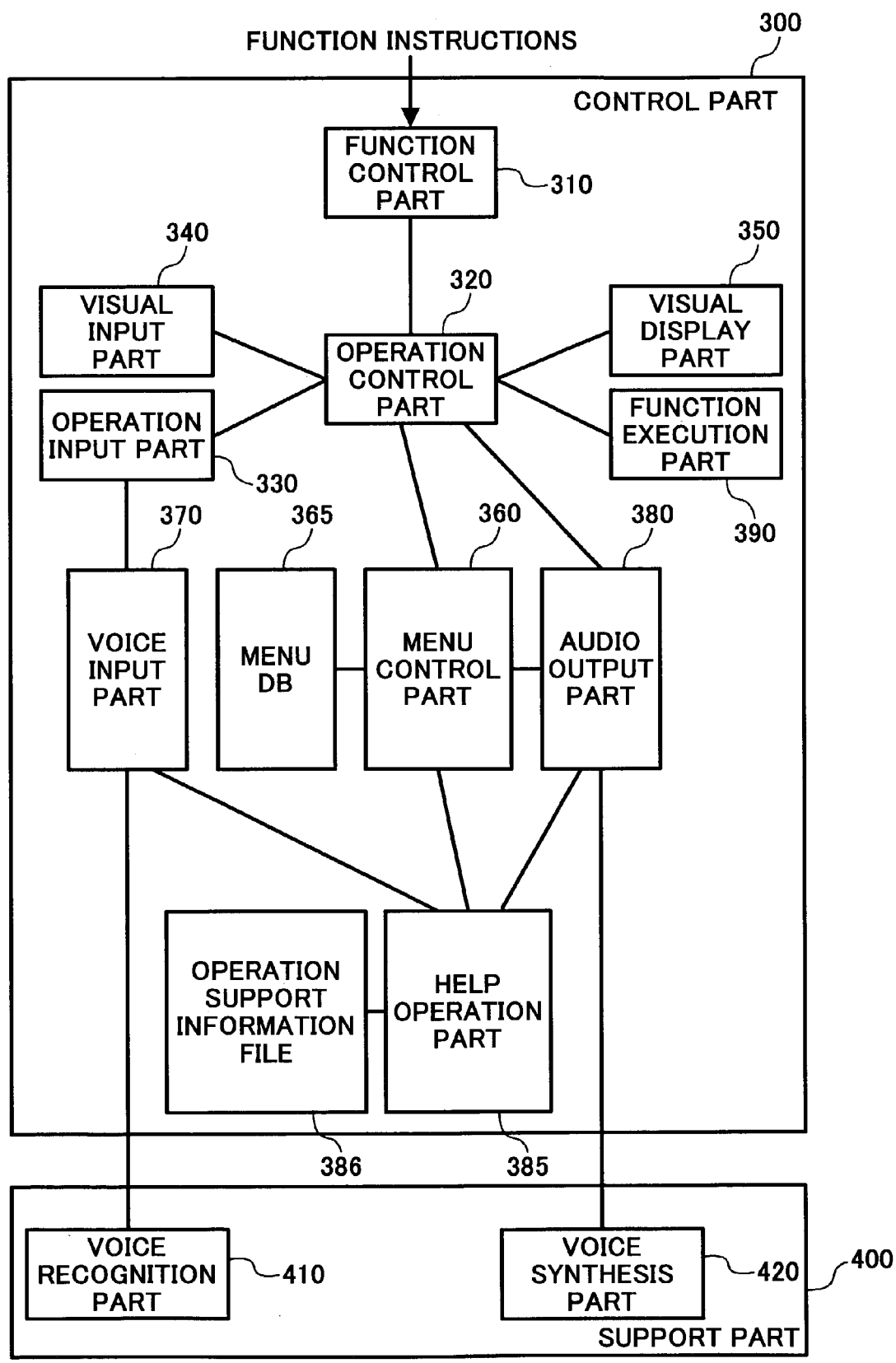
FIG. 8 is a functional block diagram of the apparatus operation device incorporated in the MFP.

FIG. 8 is a functional block diagram of the apparatus operation device incorporated in the MFP 100.

The apparatus operation device includes a control part 300 configured to perform controlling of an operation of the MFP 100 according to an instruction given by a user, and a support part 400 configured to perform processing of voice recognition and voice synthesis according to instructions from the control part 300.

The control part 300 includes a function control part 310, an operation input part 330, a visual input part 340, a visual display part 350, a menu control part 360, a menu database (DB) 365, a voice input part 370, an audio output part 380, a help operation part 385, an operation support information file 386, and a function execution part 390.

The function control part 310 determines which operation mode of the MFP 100 is to be used, either the visual mode or the non-visual mode; causes a user to instruct which function to use among from copying, facsimile, printing functions, etc.; sets initial setting for an operation relative to an instructed function; and controls the whole part of the operation.

The function control part 310 normally uses the visual mode as the initial setting. When the mode switch key "*" is depressed and the headset provided with the headphone and the microphone is connected with the MFP 100, the function control part 310 changes the visual mode to the non-visual mode. Even when the mode switch key "*" is depressed, if the headset is not connected with the MFP 100, switching from the visual mode to the non-visual mode is not performed.

The operation control part 320 performs various controls relative to operations by a user, such as various inputting operations by the user, displaying results of the inputting operations, etc.

The operation input part 330 inputs numerals input from the ten-key pad 202. In the non-visual mode, the operation input part 330 inputs various operational instructions from directional movement keys for navigating the layered menu, various keys for selecting and confirming selection of an operation or setting item of the menu, the ten-key pad 202, etc.

In the non-visual mode, information of an inputting function number, which is determined by the kind of an operated directional movement key of the ten-key pad 202, and a kind of an operated key (other than directional movement keys) of the ten-key pad 202, are transferred to the menu control part 360.

The function numbers given to operation items and setting items listed in the tree-structured operation menu are configured such that numbers given to respective operation items and/or setting items are multiplied by ten as the positions of operation items and/or setting items on the menu go down by one layer of the menu, and further, are added by one as the positions of operation items and/or setting items in the same layer move toward the last operation or setting item in the same layer. For example, in the example of FIG. 3A through FIG. 3F, the function number given to the first operation item in the first layer of the menu is 1, the function number given to a next operation item in the same first layer is 2 (1+1=2), and the function number given to the first operation item in the second layer of the operation menu is 21 (2×10+1=21).

Accordingly, when a directional movement key is operated, by performing a calculation according to the kind of the operated directional movement key based upon the function number of an operation item at the presently pointed position on the menu, a next function number is obtained, so that an operation or setting item to which the presently pointed position on the menu is to be moved is determined.

For example, when the rightward movement key "6" is depressed in the initial state (i.e., the function number of the operation item at the presently pointed position is 1), the obtained function number is 2 (1+1=2). At this time, if the downward movement key "8" is depressed, the obtained function number is 21 (2×10+1=21). Subsequently, if the upward movement key "2" is depressed, the obtained function number is 2 (20/10=2); if the downward movement key "8" is depressed, the obtained function number is 211 (21×10+1=211); and if the rightward movement key "6" is depressed, the obtained function number is 22 (21+1=22).

When the direct jump key "0" of the ten-key pad 202 is depressed, a numerical value can be directly input. A user inputs a numerical value corresponding to a desired operation or setting item from the ten-key pad 202 and depresses the confirmation key "#." Thereby, the numerical value input from the ten-key pad 202 is set as the function number. For example, when a user desires to navigate to "character/photo," by depressing the key "2," the key "1," the key "2," and the key "#" of the ten-key pad 202, the function number is set to 212.

When the voice recognition key "3" is depressed, the operation input part 330 activates the voice input part 370, and a name of an operation or setting item, a word expressing a part of the name of an operation or setting item, a keyword, or a function number, that is input through the microphone, is recognized by voice recognition at the voice recognition part 410 and converted to a corresponding function number. The converted function number is returned to the voice input part 370.

In the visual mode, the visual input part 340 performs input for selecting and setting an operation or setting item displayed on the display screen of the liquid crystal display part 201, using the touch panel on the display screen.

In the visual mode, the visual display part 350 displays various operation items and setting items on the display screen of the liquid display part 201. In the non-visual mode, a user selects an operation or setting item from the layered menu, and the visual display part 350 displays the selected operation or setting item on the display screen of the liquid display part 201.

The menu control part 360 manages the presently pointed position on the layered menu by the menu, which is held in database (DB) 365.

When the kind of an input key transferred from the operation input part 330 is for navigating the menu, the menu DB 365 is retrieved whether or not a function number that has been input exists. When the input function number exists in the menu DB 365, the present function number is replaced with the input function number, the presently pointed position on the menu is moved to an operation or setting item corresponding to the input function number, and corresponding sound is output. When the kind of an input key transferred from the operation input part 330 does not involve navigating the menu, a function associated with the key and corresponding sound output are performed.

For example, in the initial state (i.e., the function number of the operation item at the presently pointed position is 1), if the upward movement key "2" is depressed, the calculated function number is 0.1 (1/10=0.1), which is not registered in the menu DB 365. In this case, the presently pointed position on the menu is not changed.

Likewise, if the leftward movement key "4" is depressed when the presently pointed position is at the function number of 21, the calculated function number is 20 (21−1=20), which is not registered in the menu DB 365. In this case, the presently pointed position on the menu is not changed. When a non-existent function number is input using the direct jump key "0" or through voice recognition, the presently pointed position on the menu is also not changed.

However, if the rightward movement key "6" is depressed, the calculated function number is 2 (1+1=2), which is registered in the menu DB 365, so that the presently pointed position on the menu is moved to the corresponding operation item, i.e., "original document."

The voice input part 370 is activated from the operation input part 330. Voice input part 370 inputs a voice uttered by a user for a name of a operation or setting, a function number, or a word or keyword included in operation items and setting items, causes the voice recognition part 410 to recognize the input voice to be converted into a function number corresponding to a result of recognizing the input voice, and returns the converted function number to the operation input part 330.

When a numeral value is input as a result of recognizing the input voice, the numeral value is determined as a function number. When a name of an operation or setting item is input as a result of recognizing the input voice, a table stored in a memory, in which names of operation items, setting items, function numbers are arranged to correspond with each other; or the menu DB 365 is retrieved, so that the input name of an operation or setting item is converted to a function number.

For example, when a word for "character/photo" is uttered, if the word is correctly recognized by the voice recognition part 410, the function number is set to 212.

When a word included in operation items and/or setting items of the menu is uttered, operation items and/or setting items including the uttered word are retrieved from the menu DB 365. When only one operation or setting item has been retrieved, the word is converted to a function number corresponding to the retrieved operation or setting item. When multiple operation items and/or setting items have been retrieved, the retrieved operation items and/or setting items are read, and a user selects one of them.

For example, when "both-side/gathering/dividing," "binding," and "one-side to weekly magazine" exist on the menu, if a user utters the word for "weekly magazine," the word is converted to the function number for "one-side to weekly magazine." When a user utters a word not included in operation items and setting items of the menu, which is determined, using the help operation part 385, to be a keyword, the user selects an operation or setting item from among operation items and/or setting items relating the keyword. Thereby, a function number corresponding to the selected operation or setting item is obtained.

The help operation part 385 retrieves the operation support information file 386 by a keyword from the voice input part 370, and extracts operation support information corresponding to the keyword. Operation support information includes information for a group of operation items and setting items and voice information explaining the group of operation items and setting items. Voice information of the group of operation items and setting items is first read for all operation items and/or setting items in the group, so that a user can confirm what operation items and/or setting items are included in the group as candidates for selection.

The form of the first reading wherein all of the operation items and/or setting items in the group are read may be changed. Instead, the operation items and/or setting items in the group may be first read one by one.

Next, each of the candidate operation items and/or setting items in the group is read one after another, and a user inputs an instruction confirming selection of an operation item or setting item with the confirmation key "#" or navigating to a next operation item or setting item. The name of a selected operation or setting item thus selected is converted to a corresponding function number.

Alternatively, after all of the candidate operation items and/setting items in the group have been read, the user may input a number assigned to a desired candidate operation or setting item using the ten-key pad 202 or by a voice.

In the non-visual mode, the audio output part 380 functions according to instructions by the menu control part 360 and the operation control part 320. The audio output part 380 outputs operation sounds, voice guidance messages, and pieces of BGM, that represent the consequence of executing various operations and functions with the ten-key pad 202. Further, by an instruction from the help operation part 385, the audio output part 380 outputs voice information relating to a keyword uttered by a user.

The function execution part 390 stores setting values of various setting items for respective functions of the MFP 100, such as copying, facsimile, and printing functions, etc., that are given from the operation control part 320. The setting values are stored in memories of the MFP 100 assigned for the respective functions. Further, according to an instruction of the operation control part 320, the function execution part 390 executes the respective functions according to the setting values to the various setting items for the respective functions stored in the memories of the MFP 100.

As illustrated in FIG. 8, the support part 400 includes a voice recognition part 410 and a voice synthesis part 420. The voice recognition part 410 is activated by the voice input part 370. Voice recognition part 410 recognizes voices uttered by a user by voice recognition (e.g., names of operation items and function numbers of the layered menu, operating instructions, etc.) using a voice recognition dictionary for a function being used by the user (e.g., the copying function, the facsimile function, etc.). Voice recognition part 410 then returns a result of voice recognition to the voice input part 370.

The voice synthesis part 420 is activated by the audio output part 380. When feeding back a voice message to a user, the voice synthesis part 420 synthesizes a voice according to text data using a voice synthesis dictionary; changes the pitch of the voice and/or adds a reverberant sound to the voice according to an instruction from the menu control part 360; and returns a resulting voice to the audio output part 380.

In changing the pitch of the voice, if an operation or setting item instructed to the menu control part 360 is invalid, the pitch of the voice is decreased, and if the operation or setting is the one already selected, the pitch of the voice is increased.

The above-described voice has the pitch of an ordinarily uttered voice, and difference between high and low pitches of the voice are large enough such that these high and low pitches of the voice are differentiated from each other. Further, the pitches of the voice are in a range in which uttered contents can be clearly heard. For example, considering the range of voices in natural uttering and the range of voices in voice synthesis in which clarity can be maintained, the difference between the high and low pitches of the voice may be about a half-octave.

A reverberant sound is added to the voice when operation items and/or setting items exist in the lower layer of an operation item instructed by the menu control part 360. Adding a reverberant sound to a voice can be accomplished, for example, by performing arithmetic addition after inputting the voice to a delay device and an attenuator. In this case, a delay time of the delay device and an attenuation volume of the attenuator are used as control parameters. Experiments may be conducted to determine the values of these parameters such that the clarity of the voice is maintained and a user's discrimination of the reverberant sound from a natural voice is enhanced.

In the above-described example, control of a sound field is accomplished by controlling the pitch of a voice (among various properties of the voice) and by adding a reverberant sound to the voice. However, when reading an operation or setting item by a voice, control of a sound field may be accomplished by changing the speed of speech, the kind of the voice, the quality of the voice, etc.

Controlling the speed of speech can be realized, for example, by extraction and contraction of a waveform in speech synthesis by recorded voice and by extraction and contraction of length of the time of continuing a vocal sound in speech synthesis by rule.

Changing the kind of a voice can be realized, for example, by changing the speaker in speech synthesis by recorded voice, and by changing the waveform of a speech segment in speech synthesis by rule.

Changing the quality of a voice can be realized, for example, by inserting a filter after an output of the voice synthesis part 420 and by controlling the cutoff frequency of an output signal.

When the audio output part 380 outputs a guidance message by a voice, the voice synthesis part 420 may use a recorded voice for the guidance message instead of synthesizing the voice for the guidance message using text data.

Figure 9B:
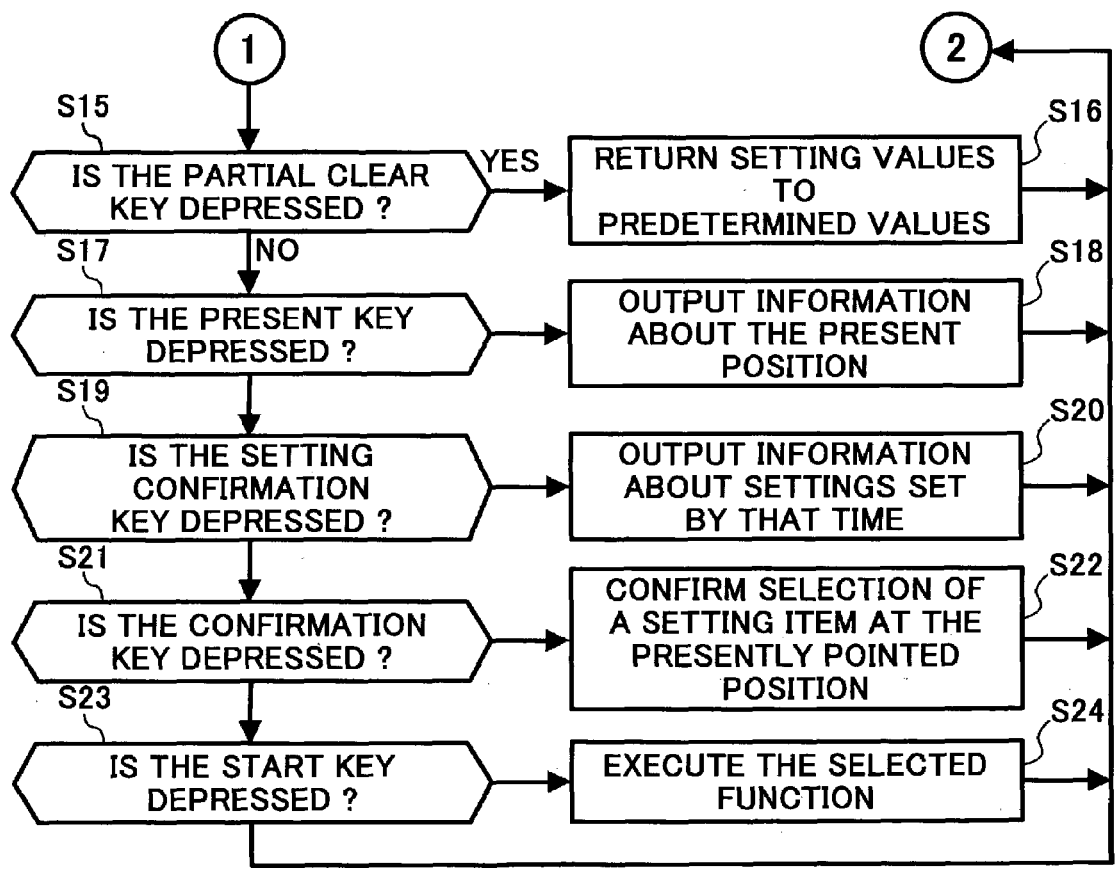

Now, an operation of the MFP 100 configured as described above is described taking as an example an operation relative to the copying function. FIG. 9A and FIG.

9B are flowcharts illustrating an exemplary process of the operation relative to the copying function.

First, if the mode switch key "*" is depressed (YES in step S1), the presently set mode is switched (step S2), and the process returns to the step S1.

When switching from the visual mode to the non-visual mode, the mode switch key "*" must be depressed and the headset provided with a headphone and a microphone must be connected with the MFP 100. When the visual mode is switched to the non-visual mode, inputting from the touch panel of the liquid crystal display part 201 is locked, and a voice message saying that "the non-visual mode has been turned on" is output through the headphone.

When switching from the non-visual mode to the visual mode, if the remaining headset connected with the MFP 100, the switched visual mode is temporary, and a result of inputting an instruction through the touch panel is output through the headphones. When the headset is disconnected from the MFP 100, the non-visual mode is switched to the visual mode.

If the presently set mode is the visual mode (YES is step S3), the operation of the MFP 100 using the touch panel of the liquid crystal display part 201 is performed by the visual input part 340 (step S4), and the process returns to the step S1.

When the presently set mode is the non-visual mode, the following processes are performed:

If a function key (FAX, COPY, PRNT, SCANNER, or NETFILE key) of the function key set 206 is depressed (YES in step S5), the layered menu is retrieved from the menu DB 365 and initial setting for a function corresponding to the depressed function key is performed (step S6), and the process returns to the step S1.

Here, assuming that the "COPY" key of the function key set 206 has been depressed, a user is informed through the headphones that "the operation relative to the copying function is ready to be started."

Next, if a directional movement key (upward, downward, leftward or rightward movement key) is depressed (YES in step S7), the presently pointed position on the menu moves upward or downward to an upper or lower level layer of the menu or toward an adjacent operation item in the same layer (step S8), and then the process returns to the step S1.

The operation input part 330 transfers information as to which key is depressed and an input function number to the menu control part 360 so that the presently pointed position on the menu can be managed by the menu control part 360.

When navigating through the menu, the menu control part 360 calls the audio output part 380 to output a sound icon, an operation sound, a piece of BGM, and the name of an operation or setting item by a voice, so that a user is informed that the operation is being performed.

At this time, the voice used in outputting the name of an operation or setting item is the one synthesized by the voice synthesis part 420. If the operation or setting item is invalid, the pitch of the voice is decreased, and if the operation or setting item is a selected one, the pitch of the voice is increased. Further, if operation items and/or setting items exist in the lower layer of the operation item, a reverberant sound is added to the voice.

Further, when the presently pointed position on the menu is moved to an operation or setting item at an end of a layer and cannot be moved further, the menu control part 360 calls the audio output part 380 to output an operation sound indicating that the presently pointed position on the menu has reached a dead end, so that a user is so informed. Also, when the presently pointed position on the menu is moved to an operation or setting item in the uppermost or lowermost layer in the upper and down directions on the layered menu, the operation sound indicating that the presently pointed position on the menu has reached a dead end is output, so that the user is so informed.

Next, if the return key "1" is depressed (YES in step S9), the presently pointed position on the menu returns to the first operation item in the uppermost layer ($1^{ST}$ LAYER) of the menu (step S10), and the process returns to the step S1.

The menu control part 360 manages the presently pointed position on the menu to be at the first operation item in the uppermost layer of the menu. In moving the presently pointed position on the menu to the first operation item in the uppermost layer of the menu, the menu control part 360 calls the audio output part 380 to output a sound icon and a voice of the name of the first operation item in the first layer to which the presently pointed position on the menu has been moved, so that a user is informed that the operation has been correctly performed.

Next, if the direct jump key "0" is depressed (YES in step S11), the presently pointed position on the menu moves to an operation item corresponding to a function number, which is subsequently input (step S12), and the process returns to the step S1.

The operation input part 330 calls the audio output part 380 to output an operation sound, a voice message saying that "please input the function number," and a piece of BGM. The user inputs a function number from the ten-key pad 202 while the piece of BGM is output. The input function number is read via the audio output part 380. When the user finally depresses the confirmation key "#," the operation input part 330 stops the piece of BGM, and the menu control part 360 outputs an operation sound, outputs a name of the operation or setting item corresponding to the input function number by a voice, and manages the presently pointed position on the menu to be at the operation or setting item corresponding to the input function number.

When the input function number corresponds to an operation or setting item of the menu, a voice for a name of the operation or setting item is synthesized by the voice synthesis part 420. Further, if operation items and/or setting items exist in the lower layer of the operation or setting item, a reverberant sound is added to the voice. When the input function number corresponds to an invalid operation or setting item, the operation or setting item is read with the pitch of the voice decreased; and if the input function number corresponds to a selected one, the setting item is read with the pitch of the voice increased.

For example, following depression of the direct jump key "0," if "435" is input through the ten-key pad 202, a message saying that "the magnification has been set to 71% reduction" is output by a voice with the pitch of the voice increased.

When the input function number corresponds to a setting item in the lowest layer of the menu, the menu control part 360 holds a setting value corresponding to the setting item as the setting value to the setting item in the menu DB 365, and the operation control part 320 stores the setting value via the function execution part 390 to a corresponding setting item in a memory of the MFP 100. The operation control part 320 also calls the visual display part 350 to display a confirmed content of the setting item on the display screen of the liquid display part 201 of the operation part 104.

Next, if the voice recognition key 3 is depressed (YES in step S13), a subsequently input voice is recognized by voice recognition and the presently pointed position on the menu moves to an operation or setting item corresponding to a result of the recognition of the input voice (step S14). The process then returns to the step S1.

The operation input part 330 calls the audio output part 380 to output, together with an operation sound, a voice message saying: "please speak a function number, a name of an operation or setting item, a word, or a keyword."

Subsequently, the operation input part 330 calls the voice input part 370, and obtains a function number designated by the user. The function number obtained by that input part 330 is based upon a function number, a name of an operation or setting item, a word, or a keyword that has been uttered by the user.

When a numerical value is recognized by voice recognition, the numerical value is determined to be an input function number.

When instead, a name of an operation or setting item or a word is recognized by voice recognition, an operation or setting item including the recognized name or word is retrieved from the menu DB 365. When only one operation or setting item has been retrieved, a function number corresponding to the operation or setting item is obtained. When a plurality of operation items and/or setting items have been retrieved, names of the operation items and/or setting items are read and the user selects one of them.

When a keyword is recognized by voice recognition, the operation support information file 386 is retrieved by the keyword using the help support part 385 to obtain operation support information corresponding to the keyword, including information of a group of operation items and setting items. A user selects a desired operation or setting item from the group of operation items and setting items and thereby a function number corresponding to the selected operation or setting item is obtained.

The function number obtained by the voice input part 370 is given to the menu control part 360, and the menu control part 360 manages the presently pointed position on the menu to be at the operation or setting item corresponding to the function number.

At this time, the menu control part 360 calls the audio output part 380 to output a sound icon and a name of the operation or setting item by a voice so that the user is informed that voice input has been correctly recognized.

When the name of an operation or setting item or the function number designated by a user corresponds to an operation or setting item of the menu, a voice of the name of the operation or setting item is synthesized by the voice synthesis part 420. If operation items and/or setting items exist in the lower layer of the operation or setting item, a reverberant sound is added to the voice. When the designated function number corresponds to an invalid operation or setting item, the operation or setting item is read with the pitch of the voice decreased. If the designated function number corresponds to a selected operation or setting item, the setting item is read with the pitch of the voice increased.

When the name of an operation or setting item or the function number designated by a voice corresponds to a setting item in the lowest layer of the menu, the menu control part 360 holds a setting value corresponding to the setting item as the setting value to the setting item as in the menu DB 365. The operation control part 320 stores the setting value via the function execution part 390 to a corresponding setting item in a memory of the MFP 100, and calls the visual display part 350 to display a confirmed content of the setting item on the display screen of the liquid crystal display part 201 of the operation part 104.

If the partial clear key "7" is depressed (YES in step S15), setting values to operation items and/or setting items in lower layers of the presently pointed position on the menu may be returned to respective predetermined setting values (step S16) in a manner described below, and the process returns to the step S1.

The menu control part 360 calls the audio output part 380 to output an operation sound and a voice message saying: "operation items and/or setting items in the layers at and below the presently pointed position will be cleared," so that the user is so informed.

Subsequently, the menu control part 360 searches an operation or setting item in lower layers of the presently pointed position, and if the operation or setting item has been changed in the predetermined setting value, a setting value to the operation or setting item is read so that the user is asked whether the setting value to the operation or setting item is to be returned to the predetermined setting value.

If the user gives an instruction (e.g., by the confirmation key "#") to return the setting value to the operation or setting item to the predetermined setting value, the setting value to the operation or setting item is returned to the predetermined setting value.

Thereafter, a sound icon and a voice message for informing completion of the operation are output so that the user is informed that partial clearing has been completed.

When a plurality of operation items and/or setting items in which predetermined values have been changed exist in the lower layers of the presently pointed position, the user may be asked whether or not each setting value to the plurality of operation items and/or setting items are to be returned to the predetermined values one by one. Alternatively, the user may be asked by a voice if all of the setting values to the plurality of operation items and/or setting items are to be returned to the predetermined values together.

Further, the menu control part 360 holds a predetermined setting value to the operation or setting item for which a setting value has been returned to the predetermined setting value as the setting value to the operation or setting item in the menu DB 365. The operation control part 320 stores the predetermined setting value via the function execution part 390 to a corresponding operation or setting item in a memory of the MFP 100, and calls the visual display part 350 to display a confirmed content of the operation or setting item on the display screen of the liquid crystal display part 201 of the operation part 104.

Next, if the present position key "9" is depressed (YES in step S17), information about which operation or setting item of the menu the presently pointed position currently is at is output (step S18), and the process returns to the step S1.

The menu control part 360 calls the audio output part 380 to output an operation sound and a voice message of the name of an operation or setting item at the presently pointed position, a setting value to the operation or setting item, etc. to the user.

When the presently pointed position is at an operation item, a voice for a name of the operation item is synthesized by the voice synthesis part 420. If operation items exist in the lower layer of the operation item, a reverberant sound is added to the voice. When the presently pointed position is at a setting item, if the setting item is an invalid one, the setting item is read with the pitch of a voice decreased, and if the setting item is a selected one, the setting item is read with the pitch of the voice increased.

Next, if the setting confirmation key 205 is depressed (YES in step S19), names of operation and/or setting items and setting values to the operation items and/or setting items, that have been selected and set by the user, are output by a voice (step S20), and the process returns to the step S1.

The menu control part 360 moves the presently pointed position on the menu to operation items and/or setting items in which predetermined setting values have been changed by the user, sequentially, and calls the audio output part 380 to output names of the operation items and/or setting items and setting values to the operation and/or setting items by a voice to inform the user. At this time, the menu control part 360 manages the presently pointed position on the menu so it moves to each of the operation items and/or setting items. If the user finds an error in the operation items and/or setting items, the error can be corrected.

Further, when a change has been made in the operation items and/or setting items, the menu control part 360 holds a setting value to a changed operation or setting item as the setting value to the operation or setting item in the menu DB 365. Also, the operation control part 320 stores the setting value via the function execution part 390 to a corresponding operation or setting item in a memory of the MFP 100, and calls the visual display part 350 to display a confirmed content of the operation or setting item on the display screen of the liquid crystal display part 201 of the operation part 104.

Next, if the confirmation key "#" is depressed (YES in step S21), selection of an operation or setting item at the presently pointed position is confirmed (step S22), and the process returns to the step S1.

The menu control part 360 calls the audio output part 380 to output an operation sound and a confirmed content of the operation or setting item by a voice to inform the user.

Further, when the operation or setting item at the presently pointed position has been confirmed, the menu control part 360 holds a setting value to the operation or setting item as the setting value to the operation or setting item in the menu DB 365. Also, the operation control part 320 stores the setting value via the function execution part 390 to a corresponding operation or setting item in a memory of the MFP 100, and calls the visual display part 350 to display a confirmed content of the operation or setting item on the display screen of the liquid crystal display part 201 of the operation part 104.

Finally, after setting of each operation or setting item has been completed, if the start key 204 is depressed (YES in step S23), the selected function (copying function, facsimile function, etc.) is executed (step S24). The process then returns to the step S1.

The operation control part 320 calls the function execution part 390 to execute the selected function. For example, if the selected function is the copying function, a copying operation is performed according to setting values that have been set by that time. When the copying operation has been completed or interrupted, the operation control part 320 calls the audio output part 380 to inform the user of the status of the copying operation by a voice.

For example, voice messages, such as "copying has been completed with the 122% magnification ratio," "copying has been unsuccessful due to a paper jam," etc., are output to inform the user.

Further, when the user has designated, for example, "40 copies," the operation control part 320 outputs a piece of BGM via the audio output part 380, so that the user can understand approximately what percentage of the copies have been completed based upon the progress of the piece of BGM.

Further, the function control part 310 monitors states of the MFP 100 in operation, and if the paper has run out, the toner is getting low, paper has jammed, or the front cover has opened, the function control part 310 calls the audio output part 380 to output, after sound icons, such voice messages as "the paper has run out," "the toner is getting low," "paper is jammed," "the front cover is opened," with respective pieces of BGM, so that the user is informed accordingly.

Although embodiments of the invention are described as outputting information in the form of particular sounds, voices, and pieces of BGM, these are only exemplary and any sounds, voices, or pieces of BGM may be output to convey information regarding the operation of an apparatus.

In the above-described embodiment, the apparatus operation device of the present invention, i.e. the control part 300 and the support part 400, is incorporated in the MFP 100.

Figure 10:
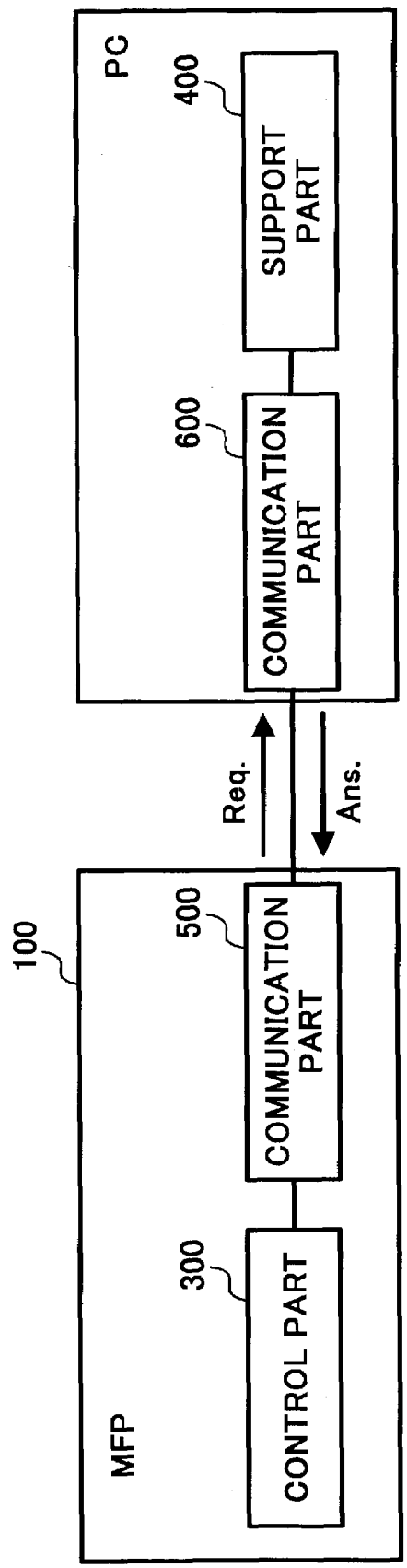
FIG. 10 is a diagram illustrating another exemplary configuration of the apparatus operation device, in which a control part of the apparatus operation device is incorporated in the MFP and a support part of the apparatus operation device is incorporated in a PC.

However, the apparatus operation device of the present invention may be configured, as illustrated in FIG. 10, such that the control part 300 is incorporated in the MFP 100 and the support part 400 is incorporated in a general purpose computer, such as a personal computer (hereinafter called a "PC"). In this case, a communication part 500 of the MFP 100 and a communication part 600 of the PC are connected with each other by a cable, a communication line, a network, or infrared or wireless communication, so that the MFP 100 and the PC communicate with each other.

Here again, although the following description will be made for the case wherein the control part 300 of the apparatus operation device is incorporated in the MFP 100 and the support part 400 of the apparatus operation device is incorporated in a PC, it is needless say that the control part 300 can be adapted to be incorporated in any apparatus having diversified functions. Specifically, the control part 300 can be adapted to be incorporated in various types of image forming apparatuses such as copiers, facsimile machines, printers, scanners, etc. in a similar manner as incorporated in the MFP 100.

In this configuration, when performing voice recognition processing,' the control part 300 of the MFP 100 transmits to the communication part 600 of the PC, via the communication part 500 of the MFP 100, a request for voice recognition processing and voice data input by the voice input part 370 of the control part 300.

The communication part 600 of the PC calls the voice recognition part 410 of the support part 400 based upon the request for voice recognition processing, and sends back to the communication part 500 of the MFP 100 a result of voice recognition processing with the request of voice recognition processing attached.

The communication part 500 of the MFP 100 judges received data to be a result of voice recognition processing based upon the attached request for voice recognition processing, and returns the received data to the voice input part 370 of the control part 300.

When performing voice synthesis processing, the control part 300 transmits to the communication part 600 of the PC, via the communication part 500, a request for voice synthesis processing and text data to be converted to voice data.

The communication part 600 of the PC calls the voice synthesis part 420 of the support part 400 based upon the request for voice synthesis processing, and sends back to the communication part 500 of the MFP 100 a result of voice synthesis processing with the request for voice synthesis processing attached.

The communication part 500 of the MFP 100 judges received data to be the result of voice synthesis processing based upon the attached request for voice synthesis processing, and returns the received data to the audio output part 380 of the control part 300.

When obtaining voice data, instead of causing text data to be converted by voice synthesis processing, according to a content of the request for voice synthesis processing (e.g., a content of the text data), a recorded voice may be selected to be used.

By sharing the function of the apparatus operation device between the MFP 100 and the PC, the MFP 100 does not have to hold dictionary information, which is relatively large in data volume, and voice recognition and synthesis processing functions, which require a relatively long processing time. Also, maintenance of dictionary and voice processing systems is easier than when these systems are incorporated in the MFP 100.

Further, a plurality of the MFPs 100 configured as described above may be connected to the above-described PC, increasing cost efficiency.

Further, the apparatus operation device of the present invention may be configured such that, among components of the apparatus operation device, the operation system relating to the visual mode and the inputting system for the non-visual mode, e.g., the ten-key pad 202, etc. are incorporated in the MFP 100 and the processing system for the non-visual mode is incorporated in the PC.

In this configuration, when the non-visual mode is selected, instructions input at the MFP 100 side are transmitted to the PC. The received instructions are processed at the PC, and if a setting item and a setting value are generated as the result, the setting value is returned to the MFP 100 to be set in a corresponding memory of the MFP 100.

By sharing the function of the apparatus operation device between the MFP 100 and the PC, it is not necessary to include the processing system for the non-visual mode in the MFP 100, and at the same time, maintenance of the processing system for the non-visual mode is easier than when the processing system is incorporated into the MFP 100.

In this case also, a plurality of the MFPs 100 configured as described above may be connected to the above-described PC to increase cost efficiency.

Further, the apparatus operation device may be configured such that switching between the visual and non-visual modes, selecting a function (e.g., copying and facsimile functions), and inputting and processing of inputting in the non-visual mode are performed by the PC; whereas setting a value to a selected operation item and executing a selected function are performed at the MFP 100.

The above-described PC can be a portable terminal with which a ten-key pad, a start key, a microphone, and headphones can be connected; and with which the MFP 100 can be connected via communication such as Bluetooth.

By sharing the function of the apparatus operation device between the MFP 100 and the PC, changes at the side of the MFP 100 can be minimized, and the processing system for the non-visual mode can be customized at the PC side for each user having the PC.

In this configuration, a user having such a portable terminal may, in the vicinity of the MFP 100: select the non-visual mode, select a function, operate the operation menu from the portable terminal, transmit resulting setting items and setting values to the setting items, and transmit an instruction of executing the function to the MFP 100.

When the MFP 100 receives an instruction of selecting a function (e.g., copying or facsimile function, etc.), the selected function is set to the MFP 100, and initial setting for the selected function is performed. Further, setting a setting value to a setting item and executing the function are also performed at the MFP 100. Result of settings is returned to the PC and the user is informed by a voice, etc.

The function of the apparatus operation device may be shared in substantially the same manner as described above between any apparatus having diversified functions and a PC, so that the above-described advantages of the present invention can be obtained with respect to any apparatus having diversified functions.

In the above-described embodiment, the visual mode is switched to the non-visual mode by depressing the mode switch key "*" and by connecting the headset provided with a headphone and a microphone to the MFP 100. However, for a visually handicapped person, searching for the headset and connecting the headset to the MFP 100 is difficult.

FIG. 11 is a diagram illustrating another exemplary configuration of the MFP 100, in which the non-visual mode can be used while the headset is continually connected with the MFP 100. As illustrated in FIG. 11, the MFP 100 includes a headset placement part 710 configured to hang a headset 720 and a determining part 700 configured to determine if the headset is hung on the headset placement part 710.

If the headset 720 is hung on the headset placement part 710, the headset placement part 710 moves from the position of a dotted line to the position of a solid line in figure by the weight of the headset 720 to contact a terminal "A".

The determining part 700 determines which terminal (terminal "A" or "B") the headset placement part 710 is contacting based upon the position of the headset placement part 710, and transmits resulting information to the function control part 310 of the control part 300.

That is, when the headset 720 is hung on the headset placement part 710, because the headset placement part 710 is contacting the terminal "A," the determining part 700 transmits a signal to the control part 300 indicating that the headset 720 is not in use, and thereby the function control part 310 of the control part 300 determines to use the visual mode.

When the headset 720 is not hung on the headset placement part 710, the headset placement part 710 contacts the terminal "B." The determining part 700 transmits a signal to the control part 300 indicating that the headset 720 is in use. Thereby, if the mode switch key "*" is used, the control part 300 determines use the non-visual mode.

With the above-described configuration, the headset 720 can always be connected with the MFP 100, and a user does not have to search for the position of a terminal to connect the headset 720.

Further, with the provision of the headset placement part 710 to the MFP 100, the location of the headset 720 is clear. Because the place where the headset 720 is located is clear, a user can quickly locate the headset 720, and can use the MFP 100 immediately without a troublesome search for the headset 720.

Furthermore, when the function control part 310 of the control part 300 has received from the determining part 700 a signal indicating that the headset 720 is off the headset placement part 710, input from the visual input part 340 is locked out at the time when the visual mode is switched to the non-visual mode. Therefore, even when a user (in particular, a visually handicapped person) unintentionally touches the touch panel of the liquid crystal display part 201, input will not be caused, and erroneous setting can be avoided.

When assistance is needed from an unimpaired person, or when a user desires to use the touch panel, the visual input part 340 can be switched on by depressing the mode switch key "*." Once assistance is complete, or a user desires to prevent use of the touch panel, the visual input part 340 may be switched off by again depressing the mode switch key "*."

The mechanism and processes set forth in the present disclosure may be implemented using a conventional general purpose microprocessor programmed according to the teachings in the present specification, as will be appreciated to those skilled in the relevant arts. Appropriate software coding can be readily prepared by skilled programmers based upon the teachings of the present disclosure, as will also be apparent to those skilled in the relevant arts.

The present invention thus includes a computer program product which may be hosted on a storage medium and include computer program instructions, which, when loaded into a computer and executed by the computer perform the processes set forth in the present specification. The storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Further, the process set forth in the present specification may be performed by loading the computer program instructions of the computer program product into a memory of a function expansion board or unit, and by executing parts of or all of the computer program instructions by a CPU provided in the function expansion board or unit.

Furthermore, the computer program instruction of the computer program product may be stored in a storage device of a server computer to be downloaded to a client computer connected with the server computer via a communication network.

Numerous modifications and variations of the present invention are possible in light of the above teachings. It is therefore to be understood that within the scope of the appended claims, the present invention can be practiced otherwise than as specifically described herein.

What is claimed is:

1. An apparatus operation device for operating an apparatus, comprising:
   an operation input device configured to allow a user to input an instruction for operating the apparatus without using eyesight, the operation input device comprising a ten-key pad and a confirmation key for confirming selection of the desired operation or setting item at the presently pointed position on the operation menu;
   an output device configured to output information informing the user of a status of inputting the instruction for operating the apparatus and a result of inputting the instruction for operating the apparatus by a sound and a voice so that the user can operate the apparatus without using eyesight; and
   an operation menu in which operation items for a function of the apparatus and setting items for each operation item are arranged in a layered tree-structure, wherein each of the operation items and the setting items in the operation menu has a function number,
   wherein the instruction for operating the apparatus is input by the user by moving a presently pointed position on the operation menu to a desired operation or setting item in the operation menu to select the desired operation or setting item to be set by designating the desired operation or setting item by inputting a function number of the desired operation or setting item with the ten-key pad, and by confirming selection of the desired operation or setting item at the presently pointed position with the confirmation key,
   wherein a first number key of a lateral line of said ten-key pad creates, when used, sideways movement of the presently pointed position on the operation menu arranged in the layered tree-structure, and
   wherein a second number key of a vertical line of said ten-key pad creates, when used, upward or downward movement of the presently pointed position on the operation menu arranged in the layered tree-structure.

2. The apparatus operation device according to claim 1, wherein the output device is configured to output information informing the user of a progress and/or a result of the operation of the apparatus by a sound and a voice when an operation is performed and/or completed by the apparatus according to the input instruction.

3. The apparatus operation device according to claim 1, wherein when the instruction for operating the apparatus has been input by the user, the output device outputs the information informing a result of inputting the instruction for operating the apparatus by a sound icon corresponding to a type of the selected operation or setting item.

4. The apparatus operation device according to claim 3, wherein when the output device outputs the information informing a result of inputting the instruction by the sound icon, a property of the sound icon is changed.

5. The apparatus operation device according to claim 1, wherein when the instruction for operating the apparatus has been input by the user, the output device outputs the information informing a result of inputting the instruction for operating the apparatus by an operation sound or a piece of background music (BGM), and wherein the output operation sound or a piece of BGM depends upon a position of the selected operation or setting item on the operation menu.

6. The apparatus operation device according to claim 5, wherein when the output device outputs the information informing a result of inputting the instruction by the operation sound or piece of BGM, a property of the operation sound or piece of BGM is changed.

7. The apparatus operation device according to claim 1, wherein when the instruction for operating the apparatus has been input by the user, a name of the desired operation or setting item at the presently pointed position and a setting value to the desired operation or setting item are read by a voice by the output device.

8. The apparatus operation device according to claim 7, wherein when the name of the desired operation or setting item at the presently pointed position on the operation menu is read by the voice by the output device, a property of the voice is changed.

9. The apparatus operation device according to claim 8, wherein when the name of the desired operation or setting item at the presently pointed position on the operation menu is read by the voice by the output device, if the desired operation or setting item at the presently pointed position on the operation menu is an invalid operation or setting item, a pitch of the voice is changed to be lower than when the desired operation or setting item at the presently pointed position on the operation menu is a valid operation or setting item.

10. The apparatus operation device according to claim 8, wherein when the name of the desired operation or setting item at the presently pointed position on the operation menu is read by the voice by the output device, if the desired operation or setting item at the presently pointed position on the operation menu is a selected operation or setting item or an operation or setting item to which a setting value has been set, a pitch of the voice is changed to be higher than when the desired operation or setting item at the presently pointed position on the menu is a non-selected operation or setting item or an operation or setting item to which a setting value has not been set.

11. The apparatus operation device according to claim 8, wherein when the name of the desired operation or setting item at the presently pointed position on the operation menu is read by the voice by the output device, if the desired operation or setting item at the presently pointed position on the operation menu is an operation item having sub-class operation items or setting items in a lower layer of the operation item in the layered tree-structure of the operation menu, a reverberant sound is added to the voice.

12. The apparatus operation device according to claim 1, wherein when the instruction for operating the apparatus has been input by the user, if the desired operation or setting item at the presently pointed position on the operation menu is a setting item to which a numerical value is to be input, a piece of BGM is output by the output device until the numerical value has been input to the setting item.

13. The apparatus operation device according to claim 1, wherein when the instruction for operating the apparatus has been input by the user, a setting content of the desired operation or setting item is output by a voice by the output device.

14. The apparatus operation device according to claim 1, wherein the operation input device comprises a partial clear key for returning setting values in operation items and/or setting items in lower layers of the presently pointed position on the operation menu in the layered tree-structure of the operation menu, for which predetermined setting values have been changed, to respective predetermined setting values; and
    wherein when the partial clear key is operated, for each of the operation items and/or setting items for which predetermined setting value have been changed, an inquiry about whether or not a setting value to the operation or setting item is to be returned to a predetermined setting value of the operation or setting item is output by a voice by the output device.

15. The apparatus operation device according to claim 1, wherein the operation input device comprises a partial clear key for returning setting values in operation items and/or setting items in lower layers of the presently pointed position on the operation menu in the layered tree-structure of the operation menu, for which predetermined setting values have been changed, to respective predetermined setting values, and
    wherein when the partial clear key is operated, an inquiry about whether or not all of setting values to the operation items and/or setting items for which predetermined setting values have been changed are to be returned to respective predetermined setting values is output by a voice by the output device.

16. The apparatus operation device according to claim 1, further comprising:
    a display device;
    wherein when the instruction for operating the apparatus has been input by the user, the output device outputs a content of the selected desired operation or setting item at the presently pointed position by a voice and the display device displays the content of the selected desired operation or setting item.

17. The operation device according to claim 1, wherein the apparatus is an image forming apparatus.

18. The operation device according to claim 1, wherein the apparatus is a multi-function peripheral.

19. The operation device according to claim 1, further comprising an initializing key arranged to bring the presently pointed position to an initial position of the layered tree-structure.

* * * * *